US008705407B2

(12) United States Patent
Thai

(10) Patent No.: US 8,705,407 B2
(45) Date of Patent: Apr. 22, 2014

(54) EFFICIENT PROTOCOLS AGAINST SOPHISTICATED REACTIVE JAMMING ATTACKS

(75) Inventor: My T. Thai, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 348 days.

(21) Appl. No.: 13/180,907

(22) Filed: Jul. 12, 2011

(65) Prior Publication Data

US 2012/0051239 A1    Mar. 1, 2012

Related U.S. Application Data

(60) Provisional application No. 61/376,913, filed on Aug. 25, 2010.

(51) Int. Cl.
*H04L 12/28* (2006.01)
*H04K 3/00* (2006.01)

(52) U.S. Cl.
USPC .................. 370/255; 370/287; 398/39; 455/1

(58) Field of Classification Search
USPC .............. 370/255, 282, 287, 328; 726/22–25; 398/39; 455/1
See application file for complete search history.

(56) References Cited

U.S. PATENT DOCUMENTS

| | | | |
|---|---|---|---|
| 7,359,676 B2 | 4/2008 | Hrastar | |
| 2008/0153423 A1* | 6/2008 | Armstrong et al. | 455/67.14 |
| 2008/0261509 A1* | 10/2008 | Sen | 455/1 |
| 2009/0227252 A1* | 9/2009 | Fenech et al. | 455/429 |
| 2009/0325478 A1* | 12/2009 | Sun et al. | 455/1 |
| 2010/0289688 A1* | 11/2010 | Sherman et al. | 342/16 |
| 2012/0051239 A1* | 3/2012 | Thai | 370/252 |

FOREIGN PATENT DOCUMENTS

WO    2008001972 A1    1/2008

OTHER PUBLICATIONS

"Defending Wireless Sensor Networks from Jamming Attacks"; Mpitziopoulos et al; IEEE 18th International Symposium on Personal, Indoor and Mobile Radio Communications, 2007. PIMRC 2007, Sep. 3-7.*
Alnifie, G., et al., "MULEPRO: a multi-channel response to jamming attacks in wireless sensor networks," 2009, Wirel. Commun. Mob. Comput. 2010, vol. 10, pp. 704-721.
Bayraktaroglu, E., et al., "On the Performance of IEEE 802.11 under Jamming," 2008, 27th Conference on Computer Communications, INFOCOM, pp. 1265-1273.
Cheng, Y., et al., "New Constructions of One- and Two-Stage Pooling Designs," 2008, Journal of Computational Biology, vol. 15, No. 2, pp. 195-205.
Gupta, R., et al., "Maximal Cliques in Unit Disk Graphs: Polynomial Approximation," 2005, In Proceedings INOC.

(Continued)

*Primary Examiner* — Benjamin H Elliott, IV
(74) *Attorney, Agent, or Firm* — Saliwanchik, Lloyd & Eisenschenk

(57) ABSTRACT

Embodiments of the invention provide systems and methods for deactivating reactive jamming attacks and other sophisticated attacks in wireless sensor networks (WSNs). In one system, trigger nodes (nodes whose transmissions invoke jammer nodes) are identified and communications between the sensor nodes of the WSN are routed to avoid sending (e.g., transmitting) information from identified trigger nodes. For example, identified trigger nodes are routed as receivers only. One method of identification uses an advanced randomized error-tolerant non-adaptive group testing technique and a clique-independent set problem solution. Another method of identification uses a hexagon tiling coloring and sequential group testing scheme.

33 Claims, 14 Drawing Sheets

(56) References Cited

OTHER PUBLICATIONS

Law, Y.W., et al., "Key Management and Link-Layer Security of Wireless Sensor Networks: Energy-Efficient Attack and Defense," Dissertation, University of Twente, 2005.

Liu, Y., et al., "Randomized Differential DSSS: Jamming-Resistant Wireless Broadcast Communication," 2010, INFOCOM, pp. 1-9.

Shin, I., et al., "Reactive Jamming Attacks in Multi-Radio Wireless Sensor Networks: An Efficient Mitigating Measure by Identifying Trigger Nodes," 2009, FOWANC, pp. 87-96.

Strasser, M., et al., "Detection of Reactive Jamming in Sensor Networks," 2009, ETH Zurich D-INFK Technical Report 634.

Van Hoesel, L., et al., "Energy-Efficient Link-Layer Jamming Attacks against Wireless Sensor Network MAC Protocols," Mar. 31, 2006. http://eprints.eemcs.utwente.nl/2691/01/VanHoesel_TR-CTIT-06-18.pdf.

Xu, W., et al., "The Feasibility of Launching and Detecting Jamming Attacks in Wireless Networks," 2005, MobiHoc, Proceedings of the 6th ACM international symposium on Mobile ad hoc networking and computing, pp. 46-57.

Xu, W., et al., "The Feasibility of Launching and Detecting Jamming Attacks in Wireless Networks," 2008, WiSec, Proceedings of the first ACM conference on Wireless network security, pp. 203-213.

Xuan, Y., et al., "On Trigger Detection Against Reactive Jamming Attacks: A Clique-Independent Set Based Approach," 2009, IEEE 28th International Performance Computing and Communications Conference (IPCCC), pp. 223-230.

\* cited by examiner

EFFICIENT PROTOCOLS AGAINST SOPHISTICATED REACTIVE JAMMING ATTACKS

CROSS-REFERENCE TO RELATED APPLICATION

This application claims the benefit of U.S. Provisional Application Ser. No. 61/376,913, filed Aug. 25, 2010, which is hereby incorporated by reference in its entirety, including all figures, tables and drawings.

BACKGROUND OF THE INVENTION

Wireless Sensor Networks (WSNs) typically include spatially distributed autonomous sensors to cooperatively monitor physical or environmental conditions. A node in the WSN may include one or more sensors, a wireless communication device (e.g., a radio transceiver), a small processor (e.g., a microcontroller), and an energy source (e.g., a battery).

WSNs have wide application in various monitoring systems. For example, WSNs have enormous critical applications in systems including, but not limited to, military surveillance and reconnaissance to keep track of the enemy, health monitoring, smart homes, and disaster area monitoring.

Nodes in the WSNs communicate over radio transmissions and a transmitter can send a message to all its receivers in a single radio transmission. However, this increases the vulnerability in communication to various security challenges such as Denial of Service (DoS) attacks.

There are several types of DoS attacks, among which, jamming attacks have become the most significant threats to WSNs because of their effectiveness and lethal damage against WSNs. The main objective of a jamming attack is to effectively jam the communication within a WSN without being discovered and located. In a jamming attack, malice via a jammer node disseminates out adversarial signals into busy channels that are filled with legitimate sensor transmissions without following any legitimate protocols. This will result in the slump of the Signal to Noise Ratio (SNR) and network throughput. The jammer node disrupts the message delivery of its neighboring sensor nodes with interference signals. Because the jammers do not need to explore the internal information of the network components, this light weight attack is easy to launch and favored by attackers.

In the realm of jamming attacks, reactive jamming poses the maximum threat while requiring the lowest attacker energy against WSNs. Therefore, the reactive jamming attack has emerged as the attack of choice for disrupting WSNs due to its efficient attack strategy and the level of difficulty required to discover such an attack is taking place. In a reactive jamming attack, a malicious node (jammer) quietly scans all the available channels to sense any activity and blatantly starts injecting an adversarial signal on that channel. The jammer node stays quiet until a legitimate transmission—even a single bit—is sensed over the channel.

Protection against reactive jamming attacks can include detecting the jamming (signal) and mitigating the effects of the jamming. Detection of interference signals from jammer nodes is non-trivial due to the need for discrimination between normal noises and adversarial signals over unstable wireless channels. Numerous attempts to detect interference signals from jammer nodes include schemes for monitoring critical communication related objects, such as Receiver Signal Strength (RSS), Carrier Sensing Time (CST), and Packet Delivery Ratio (PDR), and then comparing the results with specific thresholds, which are established from basic statistical methods and multi-modal strategies. By such schemes, jamming signals could be discovered.

However, real-world application of using these signals to locate and catch the jammer nodes is complicated and has not been settled. Furthermore, reactive jamming attacks, where the jammer nodes are not continuously active and thus do not necessarily cause large deviations of the variables monitored from normal legitimate profiles (in order to compare with specific thresholds), cannot be efficiently tackled by these methods. Therefore, many existing countermeasures focus on mitigation of the jamming attacks.

Two strategies have been adopted at sensor nodes to escape from the detected interferences, namely, channel surfing and spatial retreats. Channel surfing employs frequency hopping (FH) techniques at both communication ends. A purpose of the FH techniques is to cause the jammer nodes to become unable to find the current channel that is used for the communication, so that the attack efficiency of the jammer nodes is greatly decreased. Spatial retreating strategies require sensor nodes to retreat from the possible jammed areas such that no sensor nodes will be affected by the jamming signals. However, owing to the limited power and spectral diversity of wireless sensors, these mitigation schemes are inefficient due to their considerable computation and communication overheads. In addition, lack of pre-knowledge over possible positions of hidden reactive jammer nodes makes it difficult for legitimate nodes, when using these mitigation schemes, to efficiently evade jamming signals, especially in dense sensor networks where multiple mobile nodes can easily activate reactive jammer nodes and cause the interference.

Unfortunately, jamming attacks in WSNs are evolving at a higher rate than their available preventive countermeasures.

Existing countermeasures against reactive jamming attacks can be broadly classified into: 1) physical layer approaches, 2) medium access control (MAC) layer approaches, and 3) network layer approaches.

The physical layer approaches generally use FH (such as FH spread spectrum), Direct-Sequence Spread Spectrum (DSSS), and Code Division Multiple Access (CDMA), which tend to require a high computational cost and complexity.

The MAC layer approaches are either inherently based on FH or on repositioning the sensor nodes, which may result in network partitioning and bring in high computation overhead. Network isolation is also a concern where portions of the network become isolated from each other.

The network layer approaches quarantine possible jammed areas and re-route all the messages that originally pass the jammed areas. However, the network layer approach can create unnecessarily big jammed region and result in isolated networks. This tends to occur because many nodes in the exaggeratedly large jammed region may still be able to transmit without activating the jammers, yet they are isolated and the message delivery is interrupted. Additionally, the message overhead is relatively high during its mapping processing.

Accordingly, there continues to be a need in the art for effective and efficient schemes for protecting WSNs against reactive attacks.

BRIEF SUMMARY

Embodiments of the invention provide methods and systems for wireless sensor network (WSN) security, and in particular, security from reactive jamming attacks.

According to certain embodiments of the invention, trigger nodes, whose transmissions invoke the jammer nodes, are identified and then inhibited from transmitting messages by controlling the routing of communications in the WSN. The routing scheme regulates identified trigger nodes as terminals so that no messages that could invoke a jammer are transmitted from the trigger nodes during a time that victim nodes, which are nodes that a jammer can interfere with, are transmitting.

In one embodiment, the routing scheme can schedule victim nodes to transmit messages based on the identification results of the trigger nodes, such that the messages are transmitted when the jammers are not activated. In addition, when the trigger nodes start to broadcast, all other victim nodes can be made to stop their transmission, avoiding any jamming.

In another embodiment, the location information of trigger nodes can be used to locate the jammers and this information can be used in creating other defense strategies.

Because many attackers of WSNs play tricks to evade detections, the feedback of jammer nodes toward sensed message transmissions can be non-deterministic and/or include randomized time delays. To handle these uncertainties, one embodiment of the invention utilizes a trigger identification scheme that partitions victim nodes (nodes that can be interfered by jamming signals) into multiple testing teams and conducts group testing with the partitioned victim nodes using a constructed randomized (d, z)-disjunct matrix. During the testing, each victim node broadcasts the test messages simultaneously and leader nodes gather the feedback (interference signals) from the jammers. By generating test outcomes from these gathered feedbacks, the trigger nodes can be identified via a prompt decoding process. The partitioning phase of the trigger identification scheme models a clique-independent set problem and provides interference-free testing teams. Identification of trigger nodes in sophisticated reactive attacks can be provided by relaxing constraints and allowing for asynchronous testing.

According to another embodiment, an identification scheme is provided that uses a hexagon tiling coloring scheme and sequential group testing (SGT). Each node of the WSN can use the hexagon tiling coloring scheme to self partition into disjoint groups and assign a color. The SGT can then be performed within each hexagonal testing group to discover the trigger nodes, and nodes of the same assigned color can be simultaneously tested. The hexagon tiling coloring scheme and SGT can be implemented in a distributed fashion across a WSN.

DETAILED DISCLOSURE

Figure 1:
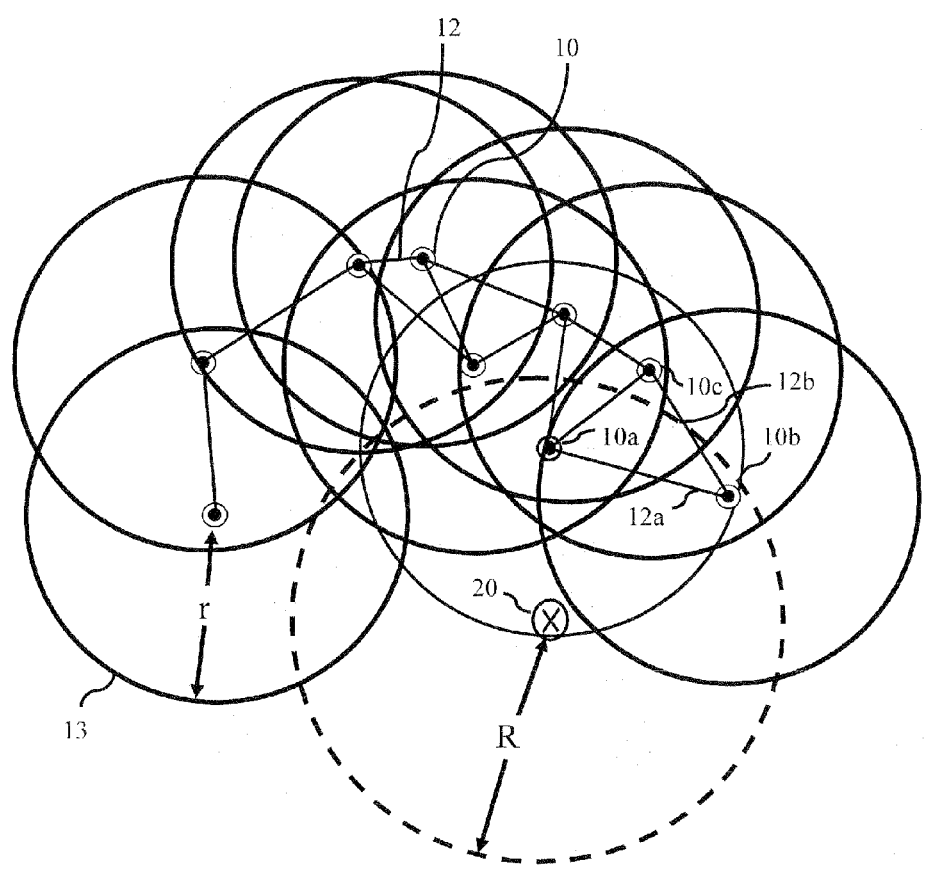
FIG. 1 is a representation of a model of a wireless sensor network.

Embodiments of the invention provide methods and systems for wireless sensor network (WSN) security, and in particular, security from jamming attacks. A reactive jamming attack, where a jammer node disrupts the message delivery of its neighboring sensor nodes with interference signals, has become a critical threat to WSNs. Certain embodiments of the subject invention provide solutions against such a reactive jamming attack and are capable of addressing other reactive variants of attacks.

An embodiment of the subject invention mitigates attacks by focusing on localized identification of trigger nodes (nodes whose transmissions invoke the jammer nodes) and then inhibiting these identified trigger nodes from transmitting. According to one implementation, identified trigger nodes are assigned to be receivers in the subject routing scheme, thereby constraining the trigger nodes and avoiding invoking the jammers. Specifically, a routing algorithm is constructed in which the trigger nodes are receivers. After identifying trigger nodes, the identification results can be used to schedule transmission of messages using the victim nodes, avoiding activation of a jammer. When a trigger node starts to broadcast, all other victim nodes stop their transmission. No frequency hopping or channel surfing is used unless an identified trigger node needs to send a message. Then, channel surfing can be used for the few trigger nodes needing to send a message. In addition, the identification of trigger nodes can be used to locate the jammers, which allows for defensive strategies to be deployed.

One method used to identify the trigger nodes according to an embodiment of the invention includes a randomized error-tolerant group testing scheme, which partitions nodes being interfered with (referred to as victim nodes) into multiple testing teams and conducts group testing based on a testing matrix. The group testing is accomplished by letting each victim node broadcast test messages simultaneously and gathering the feedback (interference) from the jammers using leader nodes. Test outcomes are generated from the gathered feedback and the trigger nodes are identified via a decoding process.

Another method used to identify the trigger nodes according to an embodiment of the invention includes localized portioning of sensor nodes into groups using a hexagon tiling and coloring scheme. The method includes partitioning the sensor nodes based on the particular hexagon the nodes belong to and the color associated with the node, and conducting group testing based on a sequential group testing where testing groups in the same color are simultaneously tested. Spatial parallelism of sensor nodes in a WSN can be exploited for identifying trigger nodes. Based on the color assignment, all testing groups are scheduled to conduct the localized trigger node detection algorithm using the sequential group testing.

By embedding the identifying of the location of jammers based on identified trigger nodes, improved countermeasure for more robust WSNs can be realized.

Referring to FIG. 1, a WSN can be modeled as a unit disk graph (UDG). The WSN can include a plurality of sensor nodes 10. Each sensor node can include one or more sensors, a wireless communication device (e.g., a radio transceiver), a small processor (e.g., a microcontroller), and an energy source (e.g., a battery or energy harvester). For a WSN formed of homogenous sensor nodes 10, the sensor nodes can be considered to have a uniform transmission radius r. The UDG model illustrates a set V of sensor nodes 10 and a set E of wireless communication links 12. The circle (e.g., circle 13) created by the transmission radius r of a node indicates the area within which a signal from one node can be received by another node. When a circle of one node overlaps another node, a communication link is considered to exist between the two nodes. In particular, an edge (i.e. wireless communication link) exists between two sensor nodes in set V when the Euclidean distance between the two sensor nodes is less than or equal to r. For example, the circle of node 10b overlaps nodes 10a and 10c because nodes 10a and 10c are spaced apart from node 10b a distance less than r. Therefore, a communication link 12a exists between the nodes 10a and 10b and another communication link 12b exists between the nodes 10b and 10c.

When modeling a jamming attack, a set of jammers J are considered to exist at unknown locations in the network. Each jammer 20 is considered to have a transmission range of at most R=αr (where α>1) during an attack (transmitting noise) and a transmission range of r during the listening mode. For the basic attacker model, jammer nodes keep idle until they sense any ongoing legitimate transmissions and then broadcast interference signals to jam all the sensors in distance R on this specific channel. The maximum damage caused by the jammer nodes are limited to the interferences toward specific sensor nodes on specific transmission channels for a short period, instead of long-term disabling of the sensors. The motivation behind this assumption arises from the basic goal of reactive jamming, which is to disrupt the message delivery with minimum energy cost. As soon as the sensors detect any jamming signals, the transmissions will be terminated, or continue on some other channels. Thus, it is unnecessary for the jammer nodes to keep sending interference signals on this channel for a long time or to disrupt all the channels with large energy overheads as an active jammer does. Moreover, from the standpoint of the attacker, it tends to be a waste to deploy two jammer nodes too close to each other. Therefore, the focus can be on jammer nodes separated by a distance greater than R. In particular, if two jammers have distance less or equal to R, they may consider the signals from each other as some activity in the network and keep injecting noise until they get depleted of their energy.

A sensor node 10a in the WSN can be referred to as a "trigger node" if there is a jammer located a distance less than or equal to r from the node. Therefore, when this node transmits, it inevitably invokes the jammer. A sensor node 10b can be referred to as a "victim node" if there is a jammer located a distance less than or equal to R from the node. By definition, a trigger node is always a victim node. If a jammer (e.g. jammer 20) is invoked, then all the victim nodes (e.g., nodes 10a and 10b) within its transmission range are jammed from receiving any messages.

According to one embodiment, each sensor can identify received jamming signals and justify whether itself is a victim node. Furthermore, the results of these self-identifications can be periodically reported to the base station by means of the existing message forwarding schemes. Therefore, for such an embodiment, the set of victim nodes is maintained at the base station. Since the detection of jamming signals has been well developed with multi-modal statistical methods, this is feasible even in unreliable environments. From the set of victim nodes, a set of trigger nodes can be identified using the group testing technique discussed in more detail below.

According to an embodiment, localized identification is employed such that the whole network does not need to be known. Rather, each node knows its neighbor.

Advantageously, embodiments provide solutions to basic and sophisticated jamming attacks.

A reactive jamming attack (RJA) can be modeled by assuming that a jammer continuously scans all the available channels in the network to sense some activity. Then, as soon as the jammer senses a signal on a channel, the jammer injects an adversarial signal, referred to herein as "noise", to drastically decrease the signal to noise ratio and communication throughput of that channel.

Generally, the duration for the transmission of noise by the jammer is larger than or equal to the duration for transmission of a trigger node. For instance, if the duration of transmission of a trigger node is larger than the duration for the transmission of noise by the jammer, the jammer finishes its transmission but will still sense some signal on the channel. Therefore, the jammer will again start sending the noise signal. This cycle would continue until the jammer does not detect a signal on the channel.

A more sophisticated attacking model can be provided based on the more sophisticated scheme adopted by jammers to avoid being caught. For example, in practice, jammers may vary their power level or choose not to respond to the noise for some cases. The attacker models can include a variant response time delay where the jammer delays each of its jamming signals with an independently randomized time interval and a probabilistic attack where the jammer responds to each sensed transmission with an independent probability. According to one embodiment, the subject method addresses a case of a random reactive jamming model where, upon sensing some signal, a jammer randomly starts jamming with a probability p<1. Because a jamming probability of less than ½ would cause jammers to fail to jam the communication in a network and allow communication in the network, a reasonable assumption for the jamming probability is p>½.

According to one aspect of the invention, all of the trigger nodes in the network can be efficiently identified with low time and message complexities. The trigger information can be used to construct an overlying routing protocol where trigger nodes are receivers only, so that the invoking of any jammer is avoided and the reactive jamming attack can be completely or substantially nullified.

According to embodiments of the invention, methods and modules for network maintenance service are provided. Implementations can be periodically invoked to identify all the trigger nodes, which can provide an effective defense against reactive jamming attacks by then converting trigger nodes to function as receivers only in the overlaying routing protocols.

In one embodiment, testing is used to identify the trigger nodes. Specifically, nodes are allowed to send out a test message and sensing is conducted to determine whether noise is triggered by the test message. Because individual testing can be time consuming, embodiments of the invention utilize group testing schemes.

Group testing (GT) tests items in multiple designated groups, instead of testing the items one by one. One method of grouping items is based on a designated 0-1 matrix $M_{t \times n}$ where the matrix rows represent the testing group and each column refers to an item. Here, $M[i,j]=1$ implies that the $j^{th}$ item appears in the $i^{th}$ testing group, and 0 otherwise. Therefore, the number of rows of the matrix denotes the number of groups tested in parallel and each entry of the result vector V refers to the test outcome of the corresponding group (row), where 1 denotes positive outcome and 0 denotes negative outcome. For example, a binary testing matrix M can give a testing outcome vector V as follows.

$$M = \begin{bmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{bmatrix} \xRightarrow{testing} V = \begin{bmatrix} 0 \\ 0 \\ 1 \\ 1 \\ 1 \\ 1 \end{bmatrix}$$

When focusing on positives for the first item (first column) and the second item (second column), then the first two groups return negative outcomes because they do not contain a positive item in either the first column or the second column. The other four groups return positive outcomes because there is a positive item in at least one of the first column and the second column.

Given that there are at most d<n positive items among total n items, all the d positive items can be efficiently and correctly identified on the condition that the testing matrix M is d-disjunct: any single column is not contained by the union of any other d columns (where a union is the bitwise Boolean sum). Owing to this property, each negative item will appear in at least one row (group) where all the positive items do not show up, therefore, by filtering all the items appearing in groups with negative outcomes, all the items left are positive.

Although providing a very simple decoding method, a d-disjunct matrix is non-trivial to construct and may involve complicated computations with high overhead, (e.g., calculation of irreducible polynomials on Galois Field). In order to alleviate this testing overhead, embodiments of the invention utilize a randomized error-tolerant d-disjunct matrix, (i.e., a matrix having less rows yet remaining d-disjunct with a high probability). Implementations of the subject invention utilizing the randomized error-tolerant d-disjunct matrix can handle test errors under sophisticated jamming environments.

In one embodiment, a clique-independent set (CIS) problem solution is applied to generate a set of nodes, for which each set will be tested using the randomized (d,z)-disjunct matrix of an embodiment of the invention.

The CIS problem refers to the problem of finding a set of maximum number of pairwise vertex-disjoint maximal cliques, also referred to as a maximum clique-independent set (MCIS). CIS is NP-hard (nondeterministic polynomial time-hard) for co-comparability, planar, line and total graphs. In addition, as proven in the paper entitled "A Graph-theoretic Framework for Identifying Trigger Nodes against Probabilistic Reactive Jamming Attacks" by Xuan et al., which is incorporated by reference in its entirety, CIS is NP-hard for UDGs.

According to an embodiment of the invention, the MCIS problem is solved on the UDG by employing a scanning disk approach as described by Gupta et al. in "Maximal cliques in unit disk graphs: Polynomial approximation" (INOC '05, Portugal, March 2005), which is hereby incorporated by reference in its entirety, to find all maximal cliques on UDG, and then finding all the MCISs using a greedy algorithm. In an alternate embodiment, although exhibiting decreased performance compared to the "greedy algorithm," the problem can be abstracted into a Set Packing problem and a $\sqrt{n}$-approximation algorithm can be obtained to identify the trigger nodes.

According to certain embodiments, in order to handle errors in the testing outcomes, an error-tolerant non-adaptive group testing is performed using a (d, z)-disjunct matrix, where in any d+1 columns, each column has a 1 in at least z rows where all the other d columns are 0. Therefore, a (d, 1)-disjunct matrix is exactly d-disjunct. By use of the subject randomized (d, z)-disjunct matrix, d positive items can still be correctly identified, even in the presence of up to z−1 test errors.

Deterministic designs for a (d, z)-disjunct matrix tend to suffer from high computational complexity, thus are not efficient for practical use and distributed implementation. Cheng et al. in "New Constructions of One- and Two-Stage pooling Designs" (Journal of Computational Biology, Vol. 15, No. 2, pp. 195-205, 2008) provide a randomized construction for a (d, z)-disjunct matrix via a q-nary matrix, which results in a (d, z)-disjunct matrix of size $t_1 \times n$ with probability p' and time complexity of $O(n^2 \log n)$ where $$t_1 = 4.28d^2 \log \frac{2}{1-p'} + 4.28d^2 \log n + 9.84dz + 3.92z^2 \ln \frac{2n-1}{1-p'}.$$

In contrast to random incidence construction such as described by Cheng et al., embodiments of the invention generate a (d, z)-disjunct matrix that can not only generate a comparably smaller t×n matrix, but also handle the case where z is not known beforehand. Instead, for certain embodiments of the invention, only the error probability of each test is bounded by a constant γ. Although z can be quite loosely upper-bounded by γt, t is not an input. According to one embodiment, a (d, z)-disjunct matrix is provided with $$t = 2\left(\frac{(d+1)^{d+1}}{d^d}\right)\left(z - 1 + \ln\left(\frac{1}{1-p'}\right) + (d+1)\ln n\right)$$

rows with probability p' for an arbitrarily large constant. Comparing the number of rows $t_1$ of the matrix constructed by Cheng et al. with the number of rows t of the matrix according to the one embodiment of the invention, it is readily apparent that the subject (d, z)-disjunct matrix is asymptotically smaller than the one constructed by Cheng et al.

Because only one probability calculation is performed for each entry, the overall time complexity is loosely upper-bounded by $O(d^2 n \log n)$. Accordingly, given that $d < \sqrt{n}$, the time complexity of generating the subject matrix is asymptotically smaller than the $O(n^2 \log n)$ time complexity of Cheng et al.

Given that each test has an independent error probability γ, according to certain embodiments, a (d, z)-disjunct matrix can be generated with $$t = \frac{\tau \ln n (d+1)^2 - 2\tau(d+1)\ln(1-p')}{(\tau - \gamma(d+1))^2}$$

having probability p', where $\tau = (d/(d+1))^d$.

In one implementation, the randomized error-tolerant d-disjunct matrix can be constructed according to the following ETG algorithm:

| Algorithm ETG construction |
| --- |
| 1: Input: n, d, z, p'; |
| 2: Output: (d, z)-disjunct matrix with probability p' |
| 3: Set $p = \frac{1}{d+1}$, |
| 4: Set $t = 2\left(\frac{(d+1)^{d+1}}{d^d}\right)\left(z - 1 + \ln\frac{1}{1-p'} + (d+1)\ln n\right)$ |
| 5: Construct a t × n matrix M by letting each entry to be 1 with probability p. |
| 6: return M |

Although GT improves the latency over individual testing, testing a group of nodes simultaneously may encounter several difficulties. For example, if some noise is sensed after performing a test, it can be difficult to determine which ones of the tested nodes triggered the jammers. Moreover, scheduling nodes in a testing group to perform the testing synchronously may result in a lot of communication overhead in the network if tested nodes are far from each other. In addition, if two groups of nodes are tested at the same time and the jammer triggered by the first group jams nodes in the second group, the testing result may be inferred incorrectly. Hence, an efficient grouping and scheduling mechanism can be important in order to reduce the overall latency.

Figure 2A:
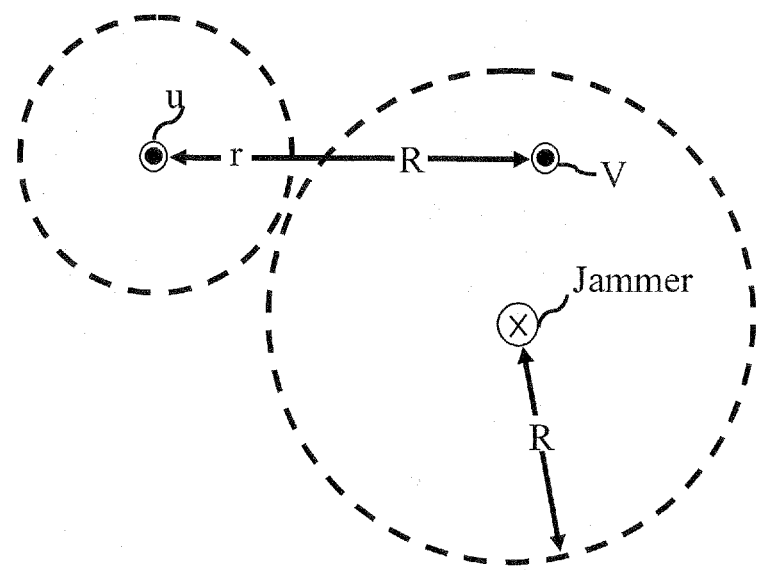
FIGS. 2A and 2B show representations of nodes of a wireless sensor network illustrating principles for group testing schemes in accordance with an embodiment of the invention.

In accordance with an embodiment of the invention, the number of testing rounds (i.e. overall latency) is efficiently reduced by the following two principles:

1) If two nodes u and v are at the distance of at least R+r (see FIG. 2A) they cannot trigger a same jammer. This enables testing of u and v in a same round without having the outcome of testing u and that of v interfered with each other. Thus, testing can be performed in parallel for two sets of nodes U and V that are R+r far away from each other.

Figure 2B:
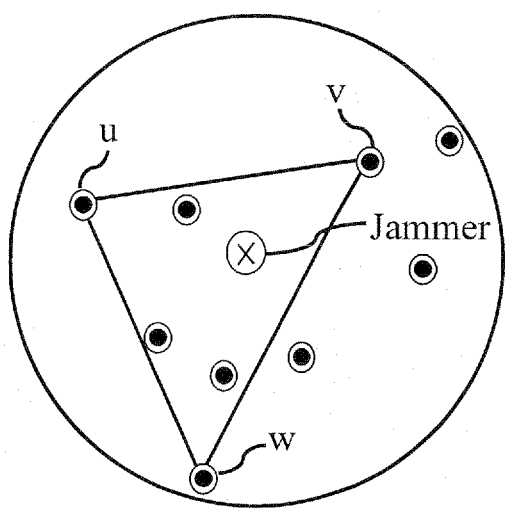

2) If u, v, and w are identified triggers, then all nodes inside the triangle whose vertices are u, v, and w are also triggers (see FIG. 2B). Furthermore, if $T=(t_1, \ldots, t_k)$ is a set of triggers, then all the nodes inside the convex hull of T are also triggers. This holds as long as R>2r.

For the basic attacker model, where the jammers deterministically and immediately broadcast jamming signals on the particular channel which carries the sensed message transmissions between sensor nodes, a method of identifying the trigger nodes can include 1) finding a maximum number of disjoint interference-free testing teams (a set of nodes U that do not invoke a jammer node whose interference signals will disrupt the communications within another testing team V) of untested victim nodes; 2) conducting non-adaptive group testing within each testing team by dividing the team members into multiple groups following a (d, 1)-disjoint matrix, and testing each group of victim nodes on different channels; 3) collecting all the testing results using a set of dominating nodes (DS) within each testing team, the DS nodes within each testing team then sending the testing results to a DS leader who then transmits the results to a base station; and 4) decoding the results at the base station and identifying the trigger nodes within the current set of tested victim nodes. This method can be iterated until all the victim nodes are tested.

In a specific embodiment example, the identification of trigger nodes involves two parallel testing types: (1) Denote the set of victim nodes within each testing team as W and the number of trigger nodes (to be estimated) as d, then a group testing procedure will run simultaneously over each testing team to identify the d trigger nodes from |W| victim nodes; and (2) Victim nodes within each testing team will be divided into the multiple groups, according to a randomized (d, 1)-disjunct matrix in accordance with an embodiment of the invention. According to one embodiment, each group of victim nodes is tested on a different channel to avoid interference among groups.

According to one embodiment, the testing procedure within each pool is two-fold: (1) Each group i corresponds to a row in the testing matrix M, and is assigned with a different channel frequency f from that of other groups. Let a victim node j broadcast a single bit on a channel frequency f if and only if M[i, j]=1, to activate possible jammer nodes nearby. Assume M has t rows and each sensor has m radios, then only m groups can be tested at a time, and all t groups can be tested within $$\left\lceil \frac{t}{m} \right\rceil$$

rounds. This is because one victim node can exist in all the t groups, and it cannot broadcast on k>m different channels in parallel. (2) A minimum dominating set (DS) of nodes of the induced subgraph within each testing team is also discovered. Upon detecting any jamming signals, a victim node will generate a jamming alarm and send it to the nearest DS node (one-hop transmission due to the definition of DS). Among the multiple DS nodes within a testing team, the one which has the shortest distance from the base station will be elected as a leader. All the jamming alarms collected by the DS nodes will be transmitted to this leader, using channel surfing schemes. The leader nodes of all the testing teams will send all the testing results (jamming alarms) along with the grouping information (e.g., the (d, 1)-disjunct matrix used) to the base station, where the identifications are completed by decoding.

Figure 3:
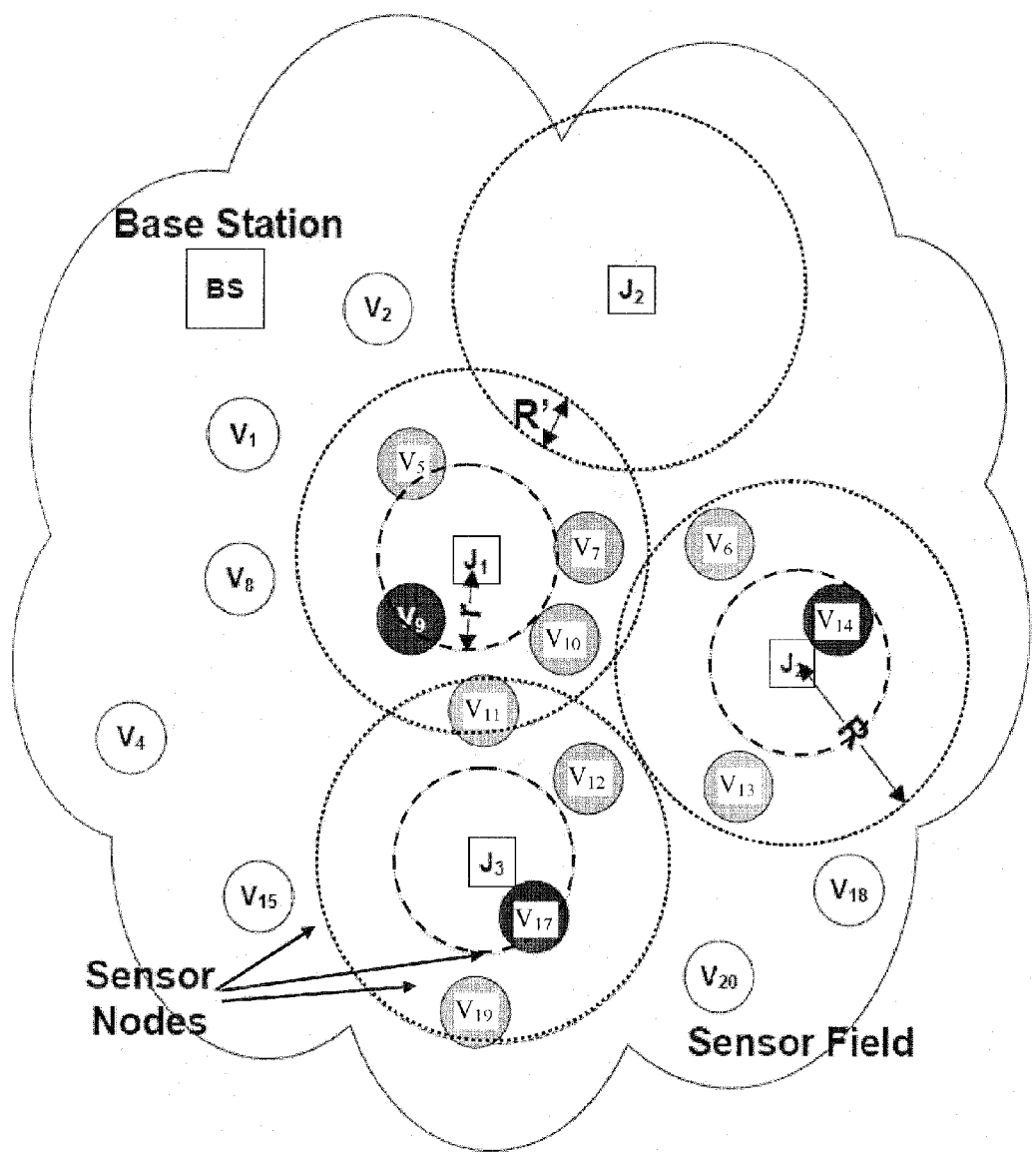
FIG. 3 is a representation of a wireless sensor network illustrating a trigger identification scheme according to an embodiment of the invention.

Referring to FIG. 3, at the beginning of the identification phase, all jammer nodes are idle and all the victim nodes in "grey" (lightly shaded) and "blue" (darkly shaded) have been discovered beforehand. The "grey" and "blue" nodes are victim nodes around jammer nodes. The "blue" nodes are also trigger nodes, which invoke the jammer nodes. The set of victims are divided into interference-free teams, where the transmissions of victim nodes within one team will not invoke a jammer node whose interference signals will disrupt the communications within another team. The "grey" nodes and "blue" nodes (which are "grey" before being identified as a trigger) are all victim nodes; thus, the nodes are divided into three testing teams: $\{v_5, v_7, v_9, v_{11}, v_{16}\}$, $\{v_{11}, v_{12}, v_{17}, v_{19}\}$, and $\{v_6, v_{14}, v_{13}\}$. Each of the testing teams are further divided into small groups and tested based on a (d, 1)-disjunct matrix. The test outcomes are sent to the base station for decoding.

For this identification scheme, the victim set is partitioned into maximal interference-free testing teams and the number of trigger nodes d is estimated to determine the testing matrix.

As stated above, two disjoint sets of victim nodes are interference-free testing teams if and only if the transmission within one set will not invoke a jammer node whose jamming signals will interfere with the communications within the other set. Although the positions of jammer nodes cannot be precisely anticipated, it is possible to discover the set of victim nodes within the same jammed area, i.e. within a distance R from the same jammer node. Any two nodes within the same jammed area will be at most 2R far from each other. Consequently, if a new subgraph is induced with all the victim nodes by connecting each node pair with a distance less than 2R, then the ones jammed by the same jammer node form a clique. Accordingly, the interference-free testing teams can be discovered in two steps:

(1) Find a set of maximum number of vertex-disjoint maximal cliques (clique-independent set); and (2) Identify the interferences between these maximal cliques, and decide interference-free testing teams.

According to an embodiment of the invention, the clique-independent set can be found using Algorithm 1 (step 1). "Gupta's MCE algorithm [3]" refers to the scanning disk approach described by Gupta et al. in "Maximal cliques in unit disk graphs: Polynomial approximation" (INOC '05, Portugal, March 2005), which is hereby incorporated by reference in its entirety.

According to Gupta's MCE algorithm, the maximal cliques in a UDG can be found by ordering edges of a UDG in decreasing order of length. Then, for each edge uv (e.g., element 12b between nodes 10b and 10c in FIG. 1):

if $d_{uv} \leq 1/\sqrt{3}$ (where $d_{uv}$ is the Euclidean distance between u and v)

output maximal clique $F_{uv}$ (where $F_{uv}$ is the set of vertices in the intersection of the two circles of radius $d_{uv}$ respectively centered at u and v);

else output three maximal cliques: $F_{uv} \cap D_{uv}^1$, $F_{uv} \cap T1_{uv}^1$, and $F_{uv} \cap T2_{uv}^1$ (where $D_{uv}^1$ is the set of all vertices in a circle with uv as its diameter, $T1_{uv}^1$ is the set of vertices in a top curved triangle formed by u, v, and an upper intersection point t of the two circles of radius $d_{uv}$ centered at u and v, and $T2_{uv}^1$ is the set of vertices in a bottom curved triangle formed by it, v, and a lower intersection point of the two circles of radius $d_{uv}$ centered at u and v);

if $d_{uv} \leq \sqrt{3}-1$ then maximal cliques have been found;

else if no vertex in $F_{uv} \setminus D_{uv}^1$, $F_{uv} \setminus T1_{uv}^1$, and $F_{uv} \setminus T2_{uv}^1$ then maximal cliques have been found;

else for each vertex $x \in F_{uv}$ position a band $B_{uv}$ with boundary on x;

the vertices in the band form a clique.

Using Gupta's MCE algorithm described above, a set of maximal (not disjoint) cliques can be determined.

---

Algorithm 1 Finding Clique-Independent Set (FCIS)

1: Input: Induced Subgraph G' = (W,E').
2: Output: The set C of maximum number of disjoint maximal cliques.
3: Find out the set S of all maximal (not disjoint) cliques by using Gupta's MCE algorithm [3].
4: while S ≠ ∅ do
5:   Choose clique C ∈ S which intersects with the minimum number of other cliques in S;
6:   C ← C ∪ {C}
7:   Remove all the maximal cliques intersecting with C;
8:   S ← S \ {C}
9: end while
10: return C

---

Figure 4:
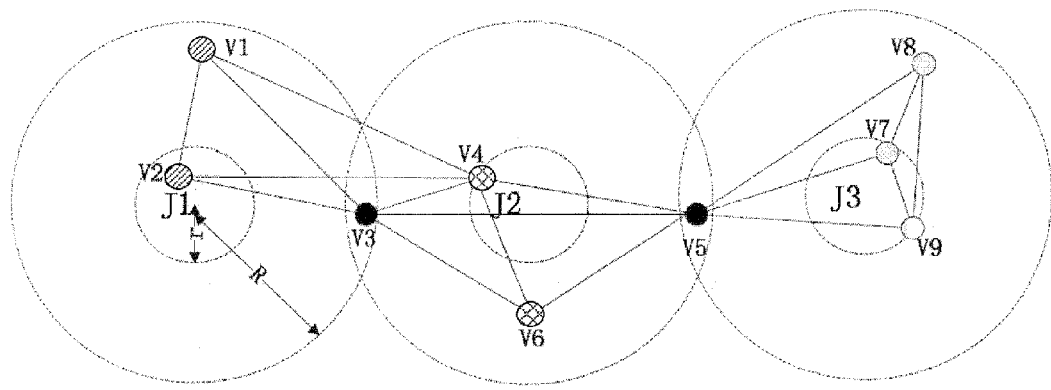
FIG. 4 is a representation of three maximal cliques $C_1=\{v_1, v_2, v_3, v_4\}$, $C_2=\{v_3, v_4, v_5, v_6\}$, $C_3=\{v_5, v_7, v_8, v_9\}$ that can be found within three jammed areas to illustrate a principle of a group testing scheme according to an embodiment of the invention.

With a subgraph G'=(W,E'), where W refers to the set of victim nodes in the network, and E'={(u, v)|δ(u, v)≤2R}, it is likely that cliques in G' correspond to the victim nodes jammed by the same jammer. However, maximal cliques that intersect with each other at some victim nodes can cause interferences when testing these "testing team" cliques in parallel. An example of this case is shown in FIG. 4. In particular, FIG. 4 shows three maximal cliques $C_1=\{v_1, v_2, v_3, v_4\}$, $C_2=\{v_3, v_4, v_5, v_6\}$, and $C_3=\{v_5, v_7, v_8, v_9\}$, which can be found within three jammed areas $J_1$, $J_2$, and $J_3$. Because maximal cliques $C_1$ and $C_2$ are overlapped (by each containing $v_3$ and $v_4$), if $C_1$ and $C_2$ are tested on the same channel simultaneously and when $J_2$ is activated by $v_4$, a jamming alarm reported by $v_3$ might interfere with the testing in $C_1$. Meanwhile, $C_1$ and $C_3$ are disjointed, but interference still exists because when $J_2$ is activated by $v_4$ in $C_1$, $J_2$ can disrupt the transmission at $v_5$, which causes error tests in $C_3$.

As illustrated by the above example, it is possible that any two maximal disjoint cliques returned by Algorithm 1 can still interfere with each other. Therefore, a minimum distance constraint between any two maximal disjoint clique pair can be used to guarantee interference-free cliques for further group testing.

Figure 5:
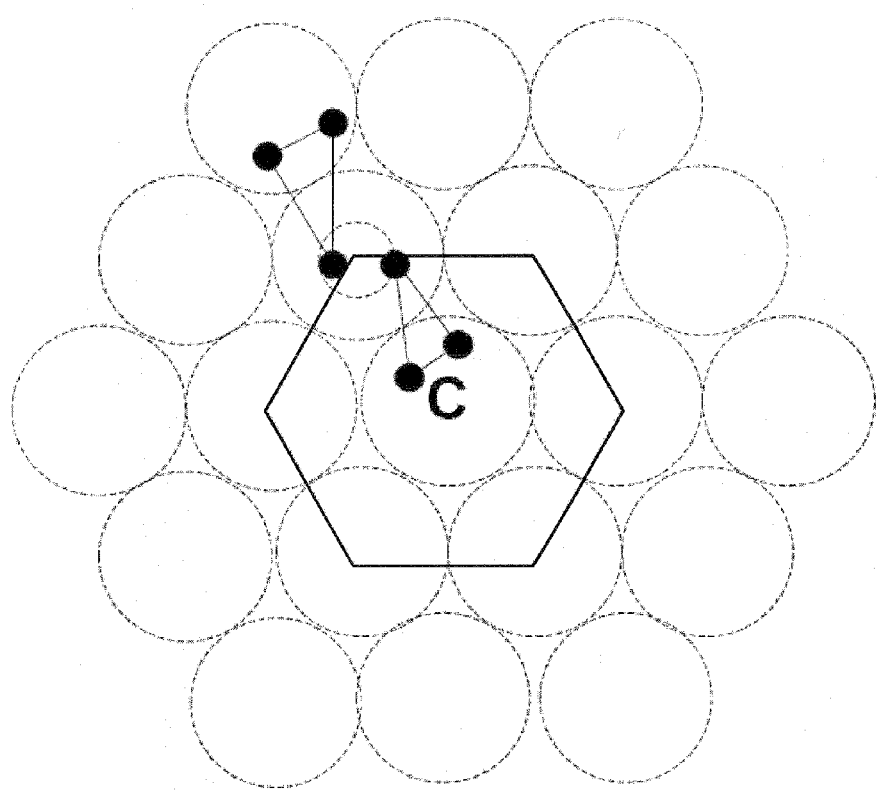
FIG. 5 shows a representation of a maximal clique C with surrounding disjoint maximal cliques.

The shortest clique-path (SCP) between any two maximal disjoint cliques is defined as the path between the nearest two nodes of these two cliques which goes through the least number of maximal cliques. For example, in FIG. 4, the SCP between cliques $C_1$ and $C_3$ is of length 1($C_2$). Accordingly, two testing teams can be considered interference-free if and only if the length of SCP between them is at least 2. In addition, as shown in FIG. 5, for any single maximal clique C, the maximal clique has at most 12 other disjoint maximal cliques, each of which has SCP of length 1 from C.

According to an embodiment of the invention, the interference-free testing teams can be determined by Algorithm 2 (step 2).

---

Algorithm 2 Testing on Interference-Free Testing Teams

1: Input: A set S of disjoint maximal cliques returned by Algorithm 1.
2: Output: Interference-free testing teams.
3: if the number of channels k ≥ 13 then
4:   use all the disjoint maximal cliques in S as testing teams, however, any two testing teams with 1-length SCP, are tested on different channels.
5: else
6:   construct an auxiliary graph H = (C,E) where each maximal clique in S is mapped into a node v ∈ C. Two nodes are connected iff their corresponding cliques have 1-length SCP from each other.
7:   find a maximal independent set (MIS) in H and test the cliques corresponding to this MIS using arbitrary channels, since they are interference-free.
8:   update H by removing all tested cliques, and iterate step 6-7 until all cliques are tested.
9: end if

---

In particular, for testing teams having 2-length pairwise SCP that are interference-free, each team can use up to k channels for testing simultaneously. Meanwhile, since each sensor has at most in radios, only m groups can be tested within each testing team. In addition, for any two testing teams that have only a 1-length SCP from each other, the testing is performed using different channels. Because each team can have up to 12 neighbors with 1-length SCP from it, up to 13 channels are required to test them simultaneously. If k≥13, then each team can have $$\min\left\{\left\lceil \frac{k}{13} \right\rceil, m\right\}$$

groups tested in parallel.

In identifying trigger nodes for the basic attacker model, an embodiment of the invention utilizes an estimated trigger upper bound $d_i$ (i.e., the upper bound of the number of trigger nodes in a testing team i). According to a specific embodiment, the upper bound $d_i$ on the number of trigger nodes is first determined as min $$\left\{\sum_{s=1}^{4}|c_s(G_i)|, |W_i|\right\},$$

where $c_s(G_i)$ is the $s^{th}$ largest clique over an induced unit disk subgraph $G_i=(W_i,E_i,2_r)$ in the testing team i. Then, $d_i$ is decreased by statistically analyzing the number of jammer nodes activated by this testing team instead of assuming the deployment of jammer nodes. The upper bounds on probabilities of different numbers of jammer nodes that can be activated by one testing team are shown in Table 1, where $c_1=R-R'$, $c_2=2R-R'$, $c_3=\sin(\pi/10)$, and where R' is the overlapping region of the radius of adjacent jammers (see FIG. 3).

TABLE 1

The Probabilities of i jammer nodes activated by one team

| i | Probability $p_i$ |
|---|---|
| 2 | $\left[\left(2c_1^2\arccos(c_2/4c_1) - 2c_2\sqrt{c_1^2 - (c_2/4)^2}\right)\bigg/(\pi c_1^2)\right]^2$ |
| 3 | $\left[\left(2c_1^2\arccos(c_2/2\sqrt{3}\,c_1) - 2c_2\sqrt{c_1^2 - (c_2/2\sqrt{3})^2}\right)\bigg/(\pi c_1^2)\right]^3$ |
| 4 | $\left[\left(2c_1^2\arccos(\sqrt{2}\,c_2/4c_1) - 2c_2\sqrt{c_1^2 - (\sqrt{2}\,c_2/4)^2}\right)\bigg/(\pi c_1^2)\right]^4$ |

The time overhead of this trigger identification procedure includes the time required to perform the discovery of maximum number of disjoint maximal cliques and the iterative tests on multiple testing teams. The "Gupta's MCE algorithm [3]" in Algorithm 1 of an embodiment of the invention finds $O(l\Delta)$ maximal cliques on UDG within $O(l\Delta^2)$ time, where $l=|E|$ and $\Delta$ refers to the maximum degree. A greedy algorithm is then used to find a MCIS from these $O(l\Delta)$ cliques with $O(l^3\Delta^3 Q)$ time: $O(l\Delta)$-time for each clique to check the overlapping with other cliques and $O(l\Delta)$-time to find a clique overlapping with minimum other cliques, where Q denotes the number of testing teams. In practice, sensor networks are not quite as dense, so the number of edges l and maximum degree A are actually limited to small values.

While the time overhead of the discovery of the maximum number of disjoint maximal cliques depends on the particular MCIS algorithms used, the time overhead of the iterative tests depends on the number of testing rounds performed.

Since the group testing procedures are conducted within each testing team, which is a clique that can be covered by a disk with radius 2R, the transmission latency between nodes within each testing team is quite low and thus negligible. Moreover, no new testing rounds would start until all the activated jammer nodes hibernate again. Therefore, the length of each testing round can be set to a predefined constant, which does not rely on the size of each testing group. To this end, the time complexity of this phase is counted in terms of the total number of testing rounds needed. Specifically, each testing round is counted since the victim nodes broadcast testing signals to activate jammer nodes nearby until the DS leader node finishes collecting the testing results. Under this basic jamming environment, where jammers deterministically reply to any sensed legitimate transmissions with interference signals, the tests within the same testing team can be conducted in a synchronized manner, i.e. the length of each testing round is set as a predefined value. By denoting the number of total testing rounds as L, the length of identification period is O(L). In sophisticated jamming environments, the synchronized constraint of the basic attacker model is relaxed and the tests are performed asynchronously.

According to one embodiment utilizing the ETG construction algorithm for constructing the randomized error-tolerant d-disjunct matrix, the minimum number of tests to identify d trigger nodes from |W| victim nodes can be loosely upper-bounded (for simplicity) by $$t(|W|, d) = O\left(d\frac{2}{i}\lceil\ln|W|\rceil\right)$$

with a high probability. Accordingly, the total number of testing rounds is upper bounded by $$O\left(\max_{i=1}^{Q}\left\{\frac{13\min\{d_i^2\lceil\ln|W_i|\rceil, |W_i|\}}{m}\right\}\right)$$

where $$d_i = \min\left\{\sum_{s=1}^{4}|c_s(G_i)|, |W_i|\right\}$$

and $c_s(G_i)$ is the $s^{th}$ largest clique over an induced unit disk subgraph $G_i=(W_i, E_i, 2r)$ in the testing team i.

Additional latency can arise from message complexity during the identification process. For the basic attacker model and calculations, it is assumed that the jammer nodes will be activated upon receiving a single message from the trigger nodes. Considering that there are approximately $$\frac{|W_i|}{d+1}$$

victim nodes in each testing group of team $W_i$, the communication overhead of each testing group in a testing round is three-fold:

(1)

$$\frac{|W_i|}{d+1}$$

testing messages broadcasted by all victim nodes in each group of team $W_i$;

(2)

$$\frac{|W_i|}{d+1}$$

jamming alarm messages sent to some DS nodes by victim nodes that sense the jamming signals; and (3) 1 (one) result report message from each DS node to the DS leader node and 1 (one) testing result message sent to the base station by each DS header node.

Since the size of the DS for each group $W_i$ is at most $|W_i|$, the overall communication complexity is $$O\left(\sum_i^Q |W_i| \max_{i=1}^Q \{d_i^2 \lceil \ln|W_i| \rceil, |W_i|\} m\right).$$

It should be noted that the amount of result report messages is not taken into account in the above message complexity; however, this amount may significantly contribute to the message complexity.

In addition to the basic attacker model, embodiments of the invention can address sophisticated attacks. For example, embodiments are directed to protection against probabilistic attack, where the jammers respond to each sensed transmission with different probabilities (instead of responding deterministically), and variant response time delay, where the jammers delay the jamming signals with a random time interval (instead of transmitting jamming signals immediately).

By using the error-tolerant disjunct matrix and relaxing the identification procedures to an asynchronous manner, embodiments of the invention can address sophisticated attacks with only small false rates in these cases. In the foregoing description, the terms test and group are interchangeable and the terms column and nodes are interchangeable.

Since, in practice, it is not trivial to establish accurate jamming models, an upper bound of the error probability is derived which does not require the beforehand knowledge of the objective jamming models. Thus, this error probability is therefore feasible for real-time identifications. In addition, since this upper bound is a relaxed bound, it can be further strengthened via learning the jamming history.

For example, for the probabilistic attack, a clever jammer can choose not to respond to some sensed ongoing transmissions in order to evade the detection. Accordingly, it can be assumed that each ongoing transmission has an independent probability $\eta$ to be responded. In the ETG construction Algorithm where each matrix entry is independent, identically distributed (IID) and has a probability p to be 1, for any single test i with $i \in [1,t]$:

$$Pr[u(i) = x] = \binom{d}{x} p^x (1-p)^{d-x}.$$

Here, u(i) refers to the number of trigger nodes in test i. Hence, for each test i, the event that the particular test contains no trigger nodes but returns a positive result has a probability of at most:

$$Pr[g(i) = 0 \,\&\, u(i) \geq 1] = \sum_{x=1}^d (1-\eta)^x \binom{d}{x} p^x (1-p)^{d-x}$$
$$= [(1-\eta)p + 1 - p]^d - (1-p)^d$$
$$= (1-\eta p)^d - (1-p)^d < (1-\eta)p$$

where g(i) refers to the outcome of test i.
Meanwhile, the event that the test contains at least one trigger, but returns a negative result, has a probability:

$$Pr[g(i)=1 \,\&\, u(i)=0]=0$$

Since, in practice, $$\eta \geq \frac{1}{2},$$

the expected number of false positive tests is at most pt/2 and the expected number of false negative tests is 0.

For the variant response time delay attack, the jammer does not respond immediately after sensing the ongoing transmissions, but instead waits for a randomized time delay. Therefore, as the introduction of group testing techniques aims to decrease the identification latency to the minimum, the test outcomes can be greatly affected by the randomized time delay. Since it is expensive to synchronize the tests among sensors, a predefined testing length $\mathcal{L}$ can be used, thus the test outcome of test $i \in [1, t]$ is generated within time interval $$\left[\left(\left\lceil \frac{i}{m} \right\rceil - 1\right)\mathcal{L}, \left\lceil \frac{i}{m} \right\rceil \mathcal{L}\right].$$

Accordingly, there are two possible error events regarding any test i.

Fp(i): test i is negative, but some jamming signals are delayed from previous tests and interfere with a current test, creating a false positive event;

Fn(i): test i is positive, but the jammer activated in this test delayed its jamming signals to occur during some subsequent tests, meanwhile, no delayed jamming signals from a previous test exists creating a false negative event.

Since the jammers described herein are assumed to block communications only on the channels where transmissions are sensed, for the following analysis, it is asserted that the interferences can only happen between any two tests i, j with $i \equiv j \pmod{m}$. The delay of the jamming signals can be denoted as a random variable $X = \{x(1), x(2), x(3); \ldots x(t)\}$ where x(i) is the delay for possible jamming signals arisen from test i, which can also be referred to as the reaction time of the jammer toward test i.

(1) For event Fp(i), consider the test (i−m), in order to have jamming signals of the test (i−m) delayed to test i, a bound is set on $x(i-m) \in (0, 2L)$. Similarly, in order to have the signals of any test j delayed to i, it is assumed that $$x(j) \in \left[\left(\frac{i-j}{m} - 1\right)\mathcal{L}, \left(\frac{i-j}{m} + 1\right)\mathcal{L}\right].$$

Further it can be assumed that the probability density function of X is $\mathcal{P}(i) = Pr[X = x(i)]$.

By considering all the tests prior to i, which are i % m, 1+i % m; . . . ; i−m, then the probability for Fp(i) is given as:

$$(1-p)^d \sum_{j=i\%m}^{i-m} \int_{(\frac{i-j}{m}-1)L}^{(\frac{i-j}{m}+1)L} \mathcal{P}(w)dw(1-(1-p)^d)$$

To simplify this expression, it is assumed that X/L follows a uniform distribution within the range [0,β] with a small β, which is reasonable and efficient for attackers in practice. Since the nature of jamming attacks lies in adapting the attack frequency due to the sensed transmissions, too large a delay does not make sense to tackle in the ongoing transmissions. Under a uniform distribution, the probability of Fp(i) becomes:

$$(1-(1-p)^d)(1-p)^d \sum_{j=maxi\%m, i-m-\beta-1}^{i-m} \frac{2}{\beta} =$$

$$(1-(1-p)^d)(1-p)^d \left(\left\lceil \frac{i}{m}\right\rceil - 1\right)\frac{2}{\beta}.$$

Therefore, the expected number of false positive tests is at most $$T^+ \le \sum_{i=1}^{t}(1-(1-p)^d)(1-p)^d(\beta)\frac{2}{\beta} \le$$

$$2\sum_{i=1}^{t}(1-(1-p)^d)(1-p)^d \le 2(1-(1-p)^d)(1-p)^d t.$$

(2) For event Fn(i), following the similar arguments above, an upper bound of the probability for Fn(i) can be had (assuming that any delays larger than l at test i will interfere the tests j following i where j∈[max(i % m,i−m−β−1), i−m]):

$$(1-(1-p)^d)\int_l^{+\infty} \mathcal{P}(w)dw \cdot \left(1-\sum_j \int_{(\frac{i-j}{m}-1)L}^{(\frac{i-j}{m}+1)L} \mathcal{P}(w)dw(1-(1-p)^d)\right) \le$$

$$(1-(1-p)^d)(1-2(1-(1-p)^d))(\beta-l)/\beta \le$$

$$(1-(1-p)^d)(1-2(1-(1-p)^d)).$$

So the expected number of false negative tests is at most $$T^- \le (1-(1-p)^d)(1-2(1-(1-p)^d))t$$

The worst-case error rate for each test can be obtained using a union bound:

$$\gamma = \frac{p}{2} + 2(1-(1-p)^d)(1-p)^d + (1-(1-p)^d)(1-2(1-(1-p)^d))$$

$$= (10\tau - 8\tau^2 - \tau^{-d} - 1)/2,$$

where $\tau=(d/(d+1))^d$. An upper bound on the number of error tests can also be given as $z=\gamma t=(10\tau-8\tau^2-\tau^{-d}-1)/2$, and taken as an input to construct the (d, z)-disjunct matrix.

By applying the derived worst-case number of error tests into the ETG construction Algorithm of an embodiment of the invention, the following Algorithm 3 can be obtained to conduct tests in an asynchronous manner to enhance the efficiency in accordance with an embodiment of the invention.

| Algorithm 3 Asynchronous Testing |
| --- |
| 1: Input: n victim nodes in a testing team. |
| 2: Output: all trigger nodes within these victim nodes. |
| 3: Estimate d as mentioned. |
| 4: Set $\gamma = (10\tau - 8\tau^2 - \tau^{-d} - 1)/2$. //upper bound of error probability for each test. |
| 5: Set $t = \frac{\tau \ln n(d+1)^2}{(\tau-\gamma(d+1))^2}$, // number of rows. |
| 6: Construct a (d, z)-disjunct matrix using ETG algorithm with t rows, and divide all the n victim nodes into t groups accordingly $\{g_1, g_2, \ldots, g_t\}$. |
| 7: |
| 8: /* For each round, conduct group testing on m groups using m different channels (radios). The testing is asynchronous in that, the m groups tested in parallel do not wait for each other to finish the testing, instead, any finished test j will trigger the test j + m, i.e., the tests are conducted in m pipelines. */ |
| 9: for i = 1 to ⌈t/m⌉ do |
| 10: Conduct group testing in groups $g_{im+1}$, $g_{im+2}$, $g_{im+m}$ in parallel; |
| 11: If any nodes in group $g_j$ with j ∈ [im + 1, im + m] detects jamming noises, the testing in this group finishes and start testing on $g_{j+m}$. |
| 12: If no nodes in group $g_j$ detect jamming noises, while at least one other test in parallel detects jamming noises, let all the nodes in group $g_j$ resend 3 more messages to activate possible hidden jammers. If no jamming signals are detected till the end of the predefined round length (L), return a negative outcome for this group and start testing on $g_{j+m}$. |
| 13: end for |

As described in Algorithm 3, after all the groups are decided, group testing is conducted on the groups in m pipelines, where for each pipeline any detected jamming signals will end the current test and trigger the next tests while groups receiving no jamming signals will be required to resend triggering messages and wait until the predefined round time has passed.

These changes over Algorithms 1 and 2, especially the changes to asynchronous testing, are located in each testing team, thus will not introduce significant overhead. However, the resulted error rates are limited to a low level.

The subject methods for identifying trigger nodes and conducting group testing can be implemented via the processors of the sensor nodes and/or a processor associated with a base station. The processor(s) implementing the subject methods control operations of the sensor nodes while in test mode by controlling the transceivers of the sensor nodes and transmission and type of data being sent, received, and analyzed.

Embodiments of the subject trigger identification procedure (Algorithms 1, 2, and 3) were simulated on a 1000×1000 square sensor field with uniformly distributed n sensor nodes, one base station, and J randomly distributed jammer nodes. Algorithm 1 was used to generate the set of nodes. For each set, Algorithm 2 and Algorithm 3 were each tested using group testing. Although a simple node deployment model is simulated, it should be understood that the subject methods are efficient for more sophisticated node deployments.

For the simulations, the transmission radius r=50 for the sensor nodes, and R=2r for the jammer nodes. In addition, m=3 radios with k>m channels are implemented with no packet-loss or external noise (except jamming signals) to guarantee the accuracy of jamming detection and test results generation. Here, R is limited to only 2r because while jammer nodes with extremely large transmission range can be favored by attackers, large transmission ranges have a huge energy cost and a higher risk to be discovered. However, it can be noted that the performance of embodiments of the invention does not rely on this assumption.

The performance assessments for the simulations compare embodiments of the subject clique-based approach with the disk-based approach described by Shin et al. in "Reactive jamming attacks in multi-radio wireless sensor networks: an efficient mitigating measure by identifying trigger nodes," (FOWANC, in conjunction with MobiHoc, 2009), which is incorporated by reference herein in its entirety, through two benchmarks: the average number of testing rounds and the average number of communication messages per victim node over a variety of environment settings. The time and message complexity is assessed and the false positive/negative rate in the presence of different jamming behaviors is investigated.

To show robustness in time and message complexity, plots are shown from simulations for the number of sensor nodes n ranging from 450 to 550 with step=2, sensor transmission radius r ranging from 50 to 60 with step=0.2, and number of jammers J ranging from 3 to 10 with step=1.

Figure 6A:
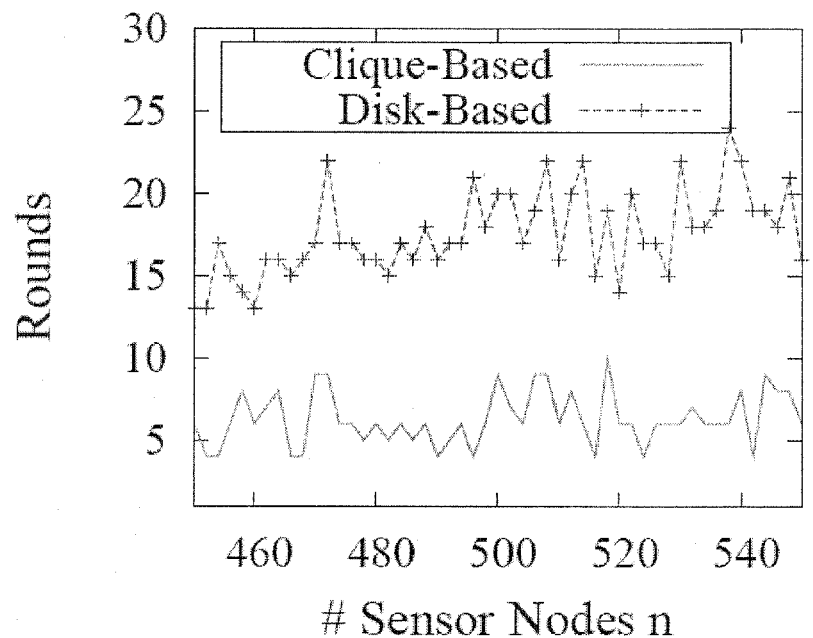
FIGS. 6A-6H show plots indicating performance of a trigger node identification procedure, referred to as Clique-Based, according to an embodiment of the invention.
Figure 6B:
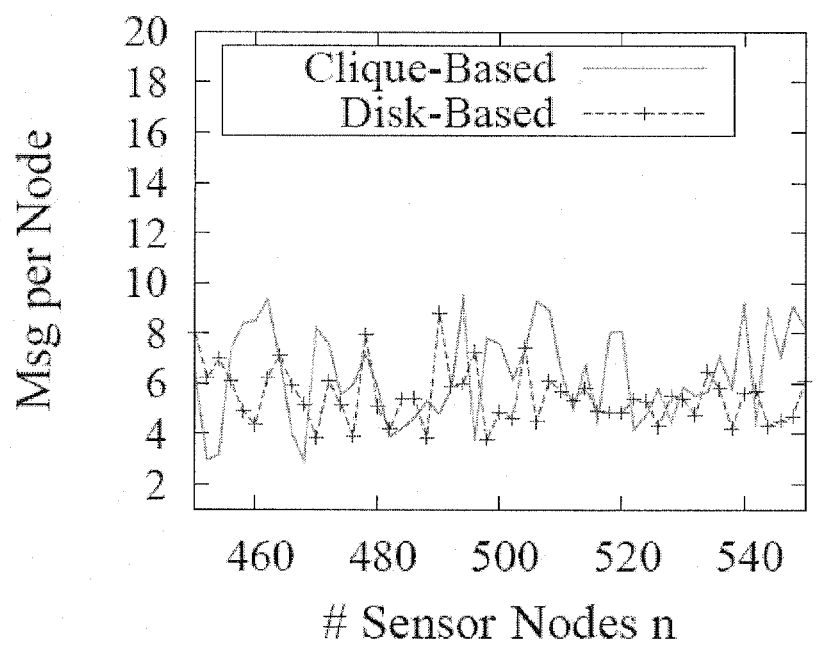

Referring to FIGS. 6A and 6B, the subject clique-based scheme (for basic attacker model) completes the identification with steadily less than 10 rounds, compared to the increasing time overhead of the disk-based solution with the more than 15 rounds to complete the identification, as the network grows denser with more sensor nodes. Meanwhile, the subject clique-based scheme's amortized communication overheads are only slightly higher than that of the disk-based solution, whereas both are below 10 messages per victim node. Therefore, the subject clique-based scheme is even more efficient and robust to large-scale network scenarios.

Figure 6C:
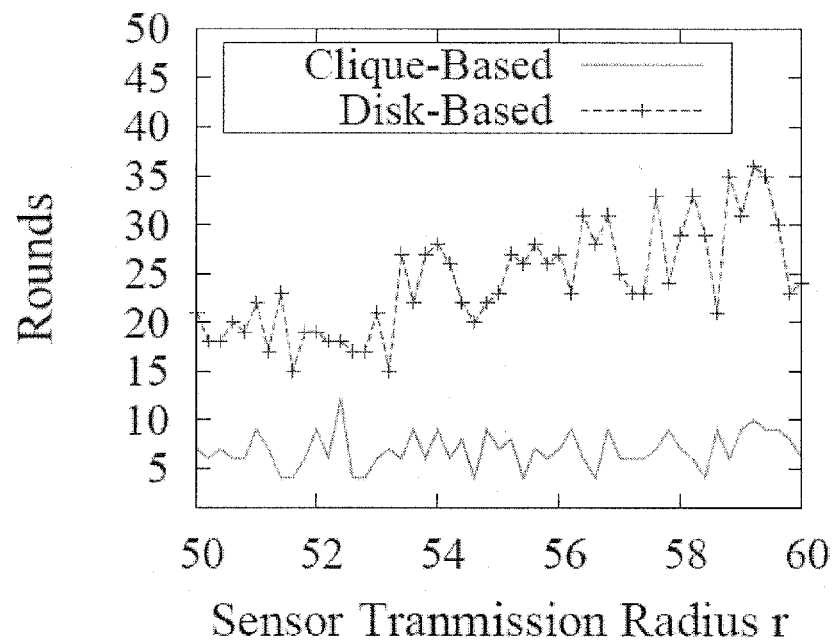
Figure 6D:
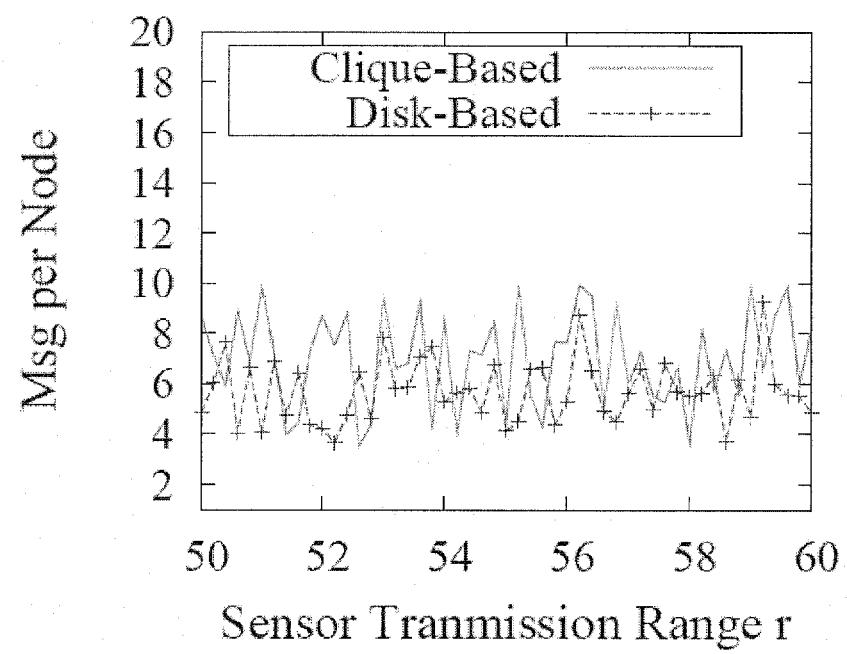

Referring to FIGS. 6C and 6D, as the sensor transmission radius increases, the time complexity of the disk-based solution gradually ascends due to the increased maximum degree $\Delta(H)$ of the disk-based solution. Comparatively, the time cost of the subject clique-based solution remains below 10 rounds, while the message complexity still approximates the disk-based solution.

Figure 6E:
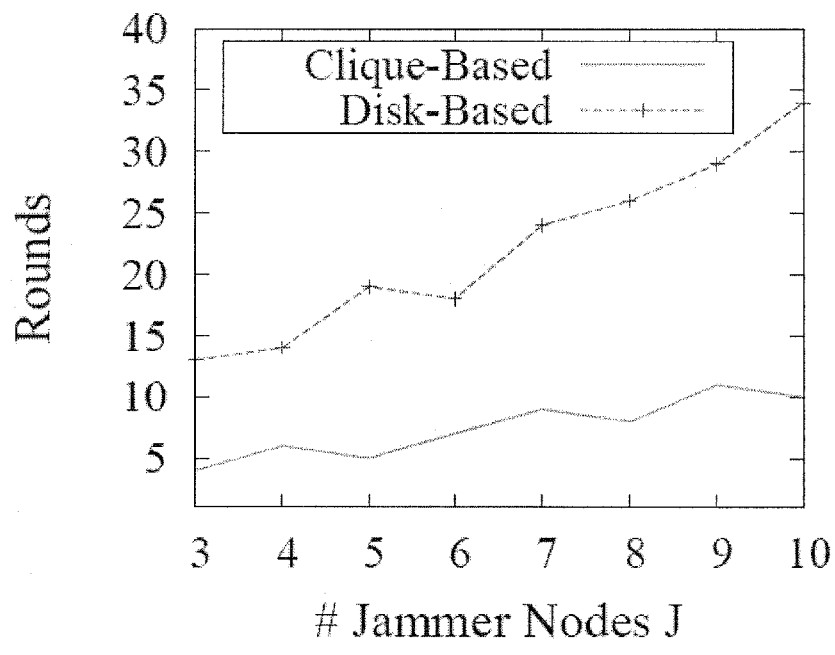
Figure 6F:
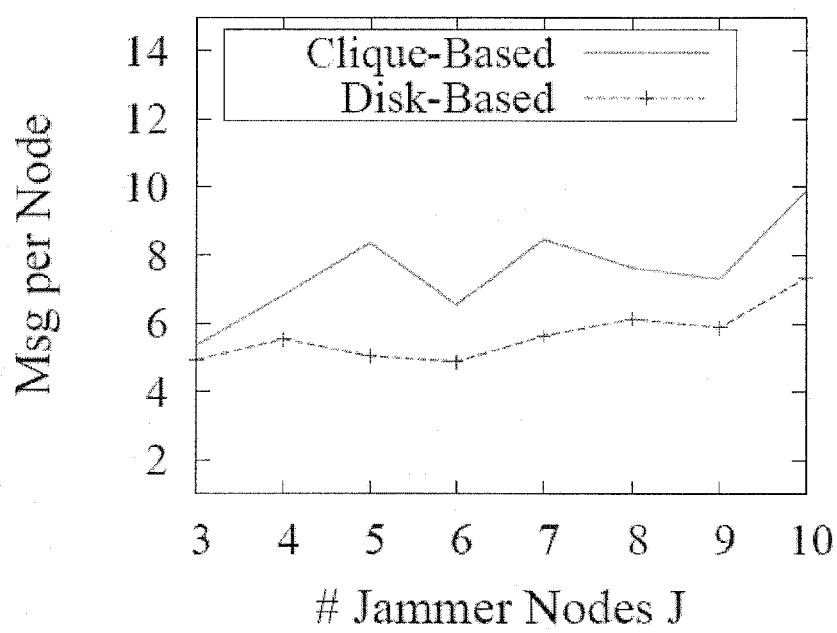

In the simulations, the sensor nodes are uniformly distributed. Therefore, as more jammer nodes are placed in the networks, more victim nodes are expected to be tested and the identification complexity will thereby increase. This is reflected in the performance of the disk-based scheme in FIGS. 6E and 6F. Comparatively, the subject clique-based scheme can still finish the identification promptly with less than 10 rounds and shows slower increase to the number of rounds. Again, the subject clique-based scheme shows slightly more communication overheads (10 messages per victim nodes), but this is still affordable to power-limited sensor nodes.

Figure 6G:
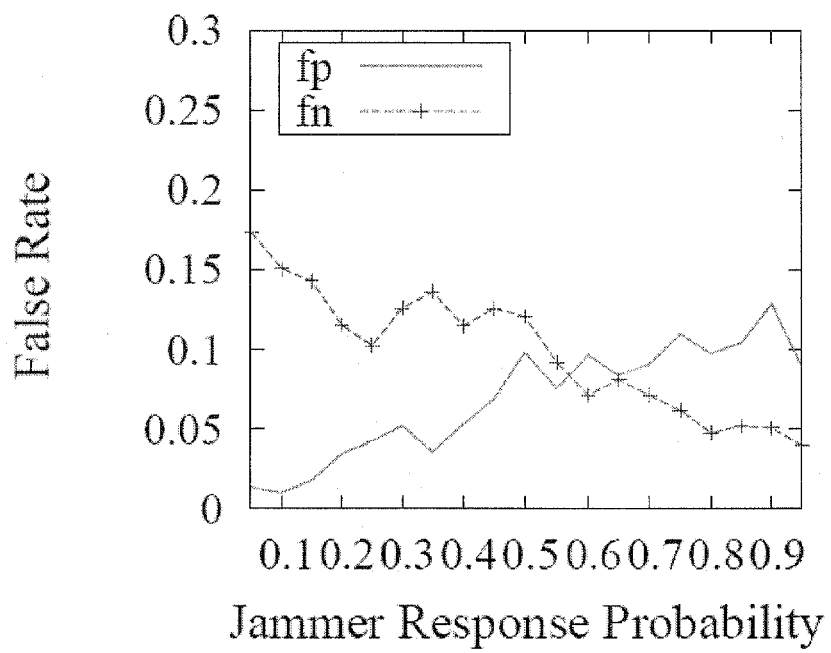
Figure 6H:
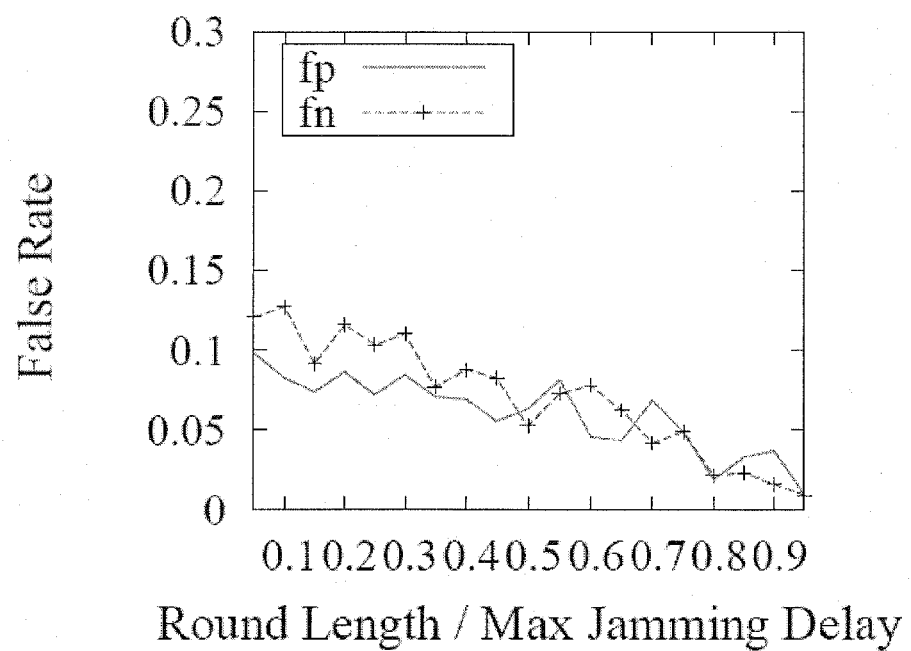

In order to show the precision of an embodiment of the subject clique-based solution under different jamming environments, two parameters of the jammer behaviors are varied using Jammer Response Probability $\alpha$ and Testing Round Length/Maximum Jamming Delay L/X. FIGS. 6G and 6H illustrate the resulting false rates, where FIG. 6G shows the false rate by different jammer response probabilities and FIG. 6H shows the false rate by different ratios of L/X. To simulate the most dangerous case, hybrid behavior is assumed for all the jammers, for example, the jammers in the simulation of FIG. 6G not only launch the jamming signals probabilistically, but also delay the jamming messages with a random period of time up to 2L. The jammers in the simulation represented by the plots in FIG. 6H respond to each sensed transmission with a probability of 0.5. These simulation results are derived by averaging 10 instances for each parameter team.

The extreme cases, where jammers respond transmission signals with a probability as small as 0.1 or delay the signals to up to 10 testing rounds later, are considered. This actually contradicts with the nature of reactive jamming attacks, which aim at disrupting the network communication as soon as any legitimate transmission starts. The motivation of such parameter setting is to show the robustness of this scheme even if the attackers sense the detection and intentionally slow down the attacks. The overall false rates are below 20% for any parameter values.

In FIG. 6G, when $\alpha > \frac{1}{2}$, which corresponds to practical cases, the false negative rates generally decrease from 10% to 5% as $\alpha$ increases. Meanwhile the false positive rate grows gently, but is still below 14%, this is because as more and more jamming signals are sent (due to their randomized time delays) more and more subsequent tests will be influenced and become false positive. In FIG. 6H, considering the practical cases where $L/X > \frac{1}{2}$, both rates decrease from around 10% to 1%, since the maximum jamming delay becomes shorter and shorter compared to the testing round length L, in which case, the number of interferences between consecutive tests is decreasing.

Accordingly, embodiments can provide efficient trigger-identification procedures with (relatively) small time complexity and acceptable message overhead. In addition, embodiments can limit the false rate identification to desirable low levels in the presence of various jamming behaviors. Considering that the subject testing procedure can be iteratively conducted, in certain embodiments, the false rate can be further decreased to enhance the identification accuracy. In accordance with one embodiment of the invention, a jamming-resilient routing scheme can be provided.

According to certain embodiments of the invention, trigger nodes can be identified using group testing schemes optimized by employing an advanced clique-independent set algorithm and a randomized (d, z)-disjunct matrix construction (see Algorithms 1 and 2).

In a further embodiment, an error-tolerant asynchronous identification algorithm is provided which allows very few test errors under unreliable jamming environments (see Algorithm 3).

According to another embodiment of the invention, the identification of trigger nodes can be accomplished by a localized approach where nodes know their neighbors and the whole network does not need to be known. Here, a method of identifying the trigger nodes can include: (1) partitioning a set of nodes into hexagonal testing groups; (2) assigning colors to hexagons in order to maximize the number of disjoint interference-free testing groups and scheduling the disjoint interference-free testing groups according to the colors; and (3) performing sequential group testing within each hexagonal testing group during the assigned time slot for the each group in order to discover all trigger nodes.

In one embodiment, trigger nodes can be identified by locally dividing sets of nodes into hexagonal groups; coloring each hexagonal group into disjoint interference free groups, where the transmission of nodes within a group will not activate the same jammer whose adversarial signals will disrupt the communications with other groups; and scheduling the set of nodes having the same color within the testing groups to fulfill a sequential GT procedure simultaneously in order to identify all the trigger nodes over each testing group. The diameter of each hexagon is selected to be small enough so that all nodes in a same hexagon can communicate with each other directly and hence the latency of forwarding messages can be minimized. All nodes in a network do not need to exchange additional messages in order to partition themselves into disjoint groups and run a sequential GT procedure.

The trigger identification algorithm within each pool of nodes uses Sequential Group Testing (SGT) to identify only nodes that belong to the convex hull of the set of triggers, which is often much less than the number of triggers.

Similarly to the Clique-based scheme of Algorithms 1-3, nodes are divided into interference-free testing groups. However, instead of applying a scanning disk approach, this embodiment utilizes a hexagon tiling coloring scheme to locally partition sensor nodes in a given WSN into a set of testing groups.

Figure 7:
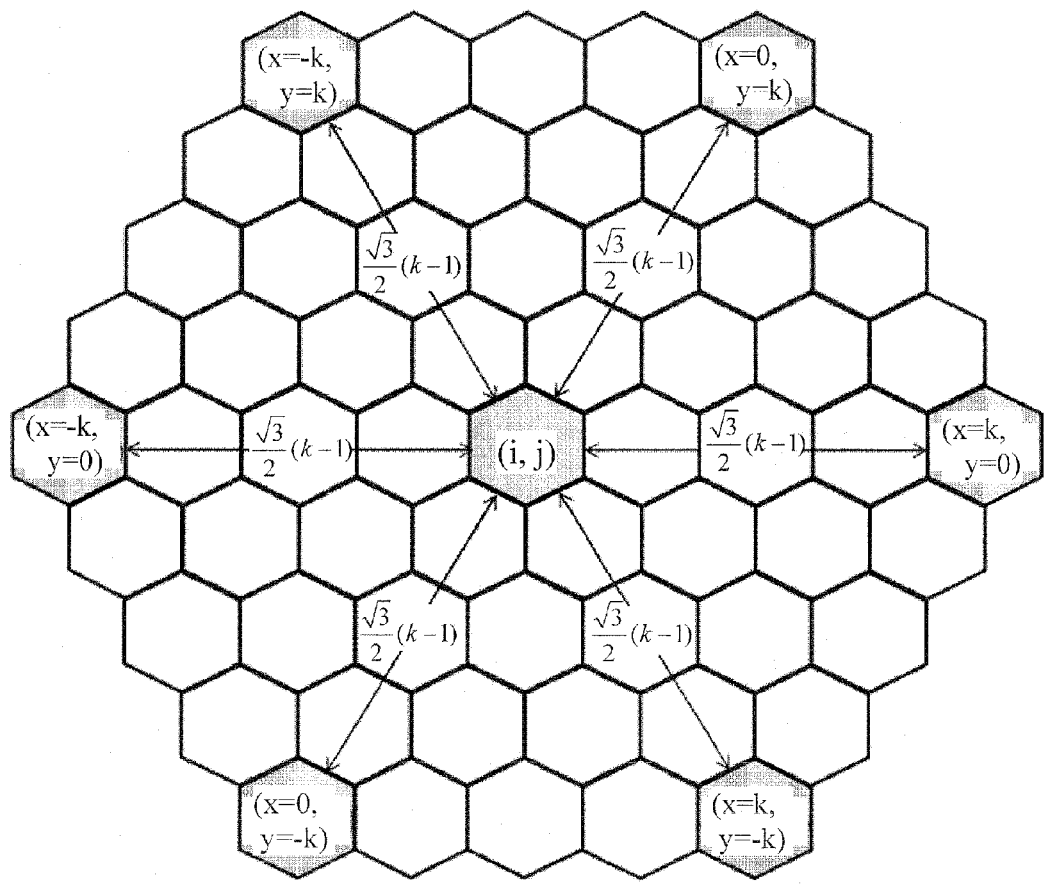
FIG. 7 shows a representation of a hexagon tiling coloring problem in accordance with an embodiment of the invention.

According to one embodiment, a hexagon tiling coloring problem solution is applied to locally partition sensor nodes in a given WSN into a set of testing groups. The hexagon tiling coloring problem refers to the problem of finding the minimum number of colors needed to color a hexagon tiling H that divides a 2D plane into regular hexagons of sides /1;2, such that any two hexagons $h_1$ and $h_2$ in H with the same color are at a distance greater than d, where d∈$\mathfrak{R}$ $^+$. The distance between the two hexagons $h_1$ and $h_2$, denoted as $d(h_1, h_2)$, is defined as the Euclidean distance between any two closest points $p_1$ and $p_2$, such that $p_1$ is located in $h_1$ and $p_2$ is located in $h_2$. This makes the hexagon tiling coloring problem different from the channel assignment problem in a cellular network, where the distance between two hexagon cells is measured from their centers. Referring to FIG. 7, in a hexagonal tiling, centers of all the hexagons are placed on a triangular lattice. Therefore, a new coordinate system can be considered in the 2D plane, with axes inclined at 60°. As shown in FIG. 7, this new coordinates system has two units vectors $$\vec{i}\left(\frac{\sqrt{3}}{2}, 0\right) \text{ and } \vec{j}\left(\frac{\sqrt{3}}{4}, \frac{3}{4}\right).$$

The centers of each hexagon h coincide with the integral coordinates in this coordinate system. Therefore, each hexagon h can be identified by the coordinates (i, j) of its center as h(i, j). The Euclidean distance between two hexagon centers $h(i_1, j_1)$ and $h(i_2, j_2)$ is given as $$d_c(h_1, h_2) = \frac{\sqrt{3}}{2}\sqrt{(i_1 - i_2)^2 + (i_1 - i_2)(j_1 - j_2) + (j_1 - j_2)^2}.$$

According to an embodiment of the invention, each node can locally identify the color of its hexagon by utilizing a coloring algorithm solving the hexagon tiling coloring problem. In a specific embodiment, sensor nodes of a WSN can locally identify the coloring group they belong to by using Algorithm 4, referred to as a $k^2$-coloring algorithm.

According to an embodiment, the $k^2$-coloring algorithm uses $k^2$ colors, where $$k = \left\lceil \frac{2d}{\sqrt{3}} + 1 \right\rceil$$

and distance d∈$\mathfrak{R}$ $^+$, to color the entire hexagon tiling and guarantee that any two hexagons $h_1$, $h_2$∈H with $d(h_1, h_2)$≤d have different colors.

| Algorithm 4 $k^2$-coloring algorithm |
|---|
| Input: Given a hexagon tiling H and a distance d ∈$\mathfrak{R}$ $^+$ |
| Output: Colored H |
| Compute $k = \left\lceil \frac{2d}{\sqrt{3}} + 1 \right\rceil$ |
| for all hexagon h(i, j) ∈ H do |
| $\quad$ Color$_{h(i,j)}$ ← (j mod k)k + (i mod k) + 1 |
| end for |

Figure 8:
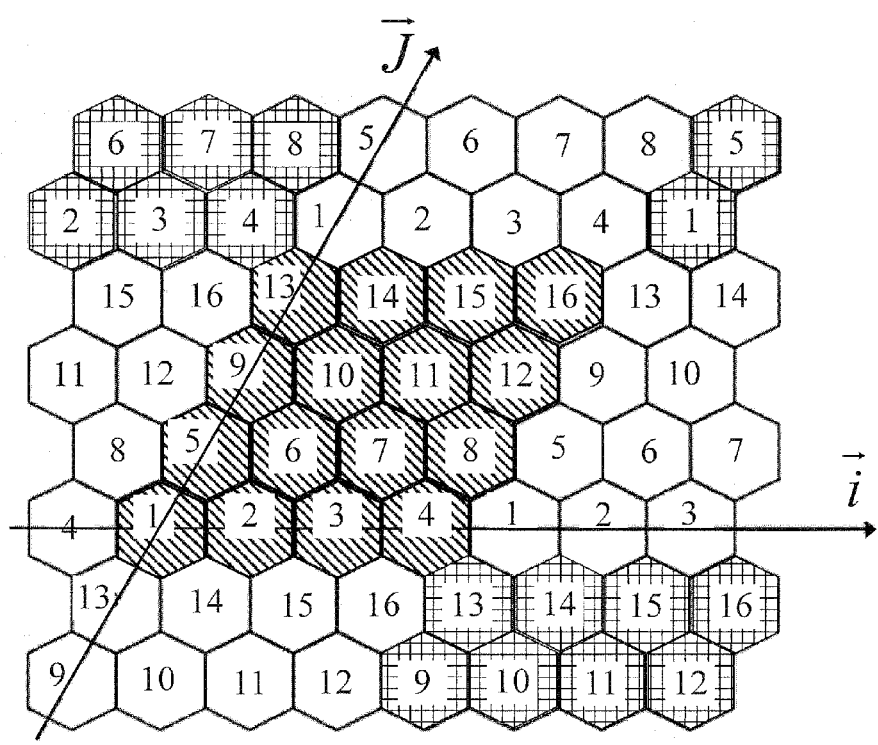
FIG. 8 shows a representation of a coloring pattern generated by an embodiment of the invention for k=4.

FIG. 8 shows the coloring pattern generated by the $k^2$-coloring algorithm for $$d = \frac{3\sqrt{3}}{2}$$

and k=4.

Accordingly, nodes can be partitioned into testing groups through a hexagonal tiling and coloring scheme, and each hexagonal testing group conducts sequential GT in order to identify all trigger nodes based on assigned colors.

Advantageously, localized partitioning of sensor nodes into groups can be accomplished using embodiments of the hexagonal tiling and coloring scheme. For example, the 2D plane on which a WSN is deployed is partitioned into regular hexagons forming a hexagon tiling, and all the nodes located in the same hexagon form a testing group. According to embodiments of the invention, the diameter $D_h$ of a hexagon in the 2D plane can be defined according to the ratio α of the transmission range radius R of a jammer to the transmission range radius r of a sensor node, each having communication range radius r, as follows: if 1<α≤2, then $D_h$=r; if 2<α≤3, then $D_h$=R−2r; and if α>3, then $D_h$=r. For these cases, the nodes located within the same hexagon have distance less than or equal to r. Hence, they can communicate with each other in one hop.

By using Algorithm 4, a sensor node can identify the color of its hexagon and also the time slot assigned to its group in the schedule. In accordance with embodiments of the invention, a sensor node in the WSN, without having a global view of the hexagon tiling can locally identify the hexagon in which it is located along with its color. For example, a sensor node in a WSN knows its neighbors and can identify its location with respect to some reference node using, for example, an ad hoc positioning method. In certain embodiments, the ad hoc positioning method can be one of known methods such as described by Niculescu in "Ad hoc positioning system (aps) using aoa" (INFOCOM: 22$^{nd}$ Annual Joint Conference of the IEEE Computer and Communications Societies, Vol. 3, 2003) and "Ad hoc positioning system (aps)" (GLOBECOM 2001), which are hereby incorporated by reference in their entirety.

The location identified by the sensor node can be stored in a memory of the sensor node according to a location coordinate ($x_v$, $y_v$) with respect to some reference node, where v refers to the sensor node in the testing group (i.e. the particular hexagon). The reference node in the testing group, also referred to as a sink node s, can have a location coordinate such that ($x_s$, $y_s$)=(0,0). Once a node v knows its coordinates ($x_v$, $y_v$) in the Cartesian system, then even without having the global view of the hexagon tiling, the node can locally compute its coordinates $\left(x\frac{h}{v}, y\frac{h}{v}\right)$ in the new coordinate system on the hexagon tiling. Furthermore, the node can identify the hexagon it belongs to. For instance, a node v at coordinates $(x_v, y_v)$ in the Cartesian coordinates can compute its coordinates $\left(x\frac{h}{v}, y\frac{h}{v}\right)$ in the new coordinate system as:

$$x_v^h = \frac{\left\{x_v - \frac{y_v}{\tan\frac{\pi}{3}}\right\}}{\frac{\sqrt{3} D_h}{2}} \text{ and } y_v^h = \frac{y_v \sin\frac{\pi}{3}}{\frac{\sqrt{3} D_h}{2}}.$$

The coordinates of the hexagon h(i, j) in which node v is located is given as:

$$i = \left\lfloor \frac{\left\{x_v - \frac{y_v}{\tan\frac{\pi}{3}}\right\}}{\frac{\sqrt{3} D_h}{2}} + \frac{1}{2} \right\rfloor \text{ and } j = \left\lfloor \frac{y_v \sin\frac{\pi}{3}}{\frac{\sqrt{3} D_h}{2}} + \frac{1}{2} \right\rfloor.$$

In accordance with an embodiment of the invention, by using Algorithm 4 and $$d = R + r,$$

$$k = \left\lceil (R+r) \bigg/ \frac{\sqrt{3}r}{2} \right\rceil = \left\lceil \frac{2(\alpha+1)}{\sqrt{3}} \right\rceil \text{ (if } \alpha \leq 2 \text{ or } \alpha > 3\text{) and}$$

$$k = \left\lceil (R+r) \bigg/ \frac{\sqrt{3}(R-2r)}{2} \right\rceil = \left\lceil \frac{2(\alpha+1)}{\sqrt{3}(\alpha-2)} \right\rceil \text{ (if } 2 < \alpha \leq 3\text{),}$$

node v can compute the color of the hexagon it belongs to as:

$\text{Color}_{H(i,j)} \leftarrow (j \mod k)k + (i \mod k) + 1.$

When $\alpha > 2$, all trigger nodes located in a hexagon h trigger a single common jammer. A node v located in a hexagon $h_1$ cannot be affected by the Noise injected by a jammer/invoked by a trigger node $v_t$ located in another hexagon $h_2$, where $d(h_1, h_2) > R+r$. Further, so long as $d = (R+r)$, the number of colors c used by Algorithm 4 to color the entire hexagon tiling is:

$$\left\lceil \frac{2}{\sqrt{3}}(\alpha+1) + 1 \right\rceil^2, \text{ when } D_h = r, \text{ and}$$

$$\left\lceil \frac{2}{\sqrt{3}} \frac{(\alpha+1)}{(\alpha-2)} + 1 \right\rceil^2, \text{ when } D_h = R - 2r.$$

In identifying trigger nodes, an embodiment of the invention utilizes sequential GT and convexity of trigger nodes so as to identify all trigger nodes with minimum testing latency in each hexagonal testing group. According to a specific embodiment, once the sensor nodes are partitioned into testing groups, tests can be carried out for each node i of a hexagonal testing group of color j to detect all trigger nodes while all testing groups in the same color can be tested simultaneously. The algorithm that can be used is referred to as a TNI-SGT (Trigger Node Identification based on Sequential GT) algorithm. One embodiment of the TNI-SGT algorithm is provided as Algorithm 5.

---

Algorithm 5 TNI-SGT Algorithm

1: INPUT: A set U of sensor nodes inside a hexagon
2: OUTPUT: Set of triggers T in U.
3: All nodes in a group $N_h$ synchronously performs the following to identify all trigger nodes.
4: /* Check for the presence of triggers inside the hexagon */
5: All nodes in U transmit $TEST_1$ packet in $t_{test}$ time
6: if No Noise exists after $t_{test} + \frac{r}{s}$ then
7:   Return T = ∅ and exit
8: end if
9: T ← ∅
10: /* Find the first trigger */
11: $v_0$ ← ISTN (ConvexHull(U))
12: U ← U \ $v_0$, T ← $\{v_0\}$
13: while U ≠ ∅ do
14:   for $v_i \in$ U do
15:     $d_T(v_i)$ = Minimum distance from $v_i$ to the exterior of the ConvexHull(T)
16:   end for
17:   Sort U = $\{v_1, \ldots, v_{|U|}\}$ so that $d_T(v_1) \leq \ldots \leq d_T(v_{|U|})$
18:   Find $v_t$ ← ISTN(U) or return T if no such trigger exists
19:   U ← U \ $\{v_t, \ldots, v_{|U|}\}$ /*Quick Elimination */
20:   T ← T ∪ $\{v_t\}$
21:   T ← T ∪ { nodes inside ConvexHull(T)} /* Quick Identification*/
22:   U ← U \ T
23: end while
24: return T

---

In an embodiment, each testing round is set with a predefined constant time slot because each hexagonal testing group with the same color conducts the sequential GT procedure at the same time, and no new testing round would start until activated jammers turn themselves into listening mode. Based on the constraint on distance between any two jammers $j_1$ and $j_2$ of $d(j_1, j_2) > R$ (used to avoid mutual invocation between the two jammers) when partitioning the nodes into the testing groups, only one jammer is activated by nodes within a hexagon.

Figure 9:
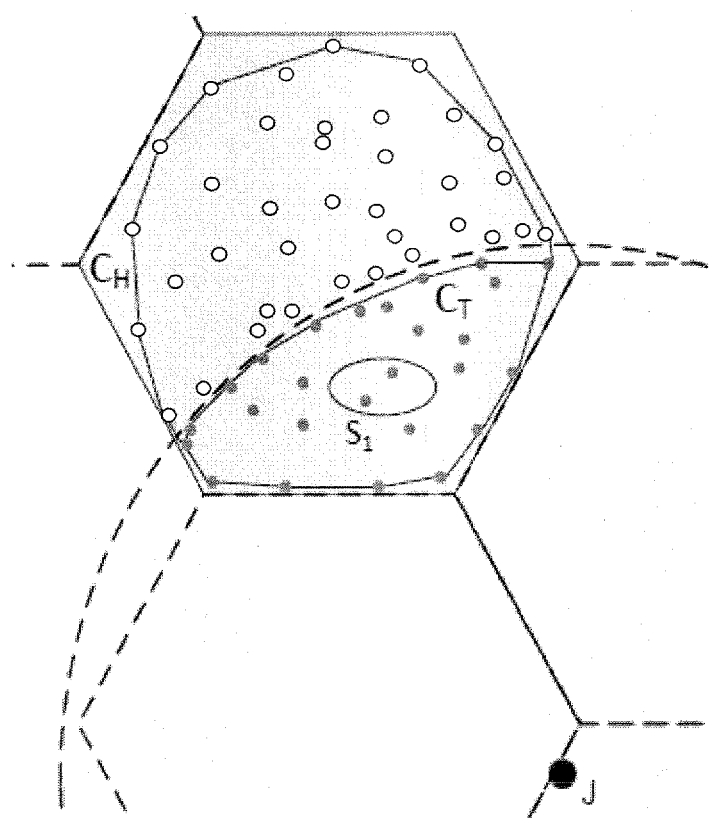
FIG. 9 shows a representation of trigger nodes in a hexagon in accordance with an embodiment of the invention.

In the TNI-SGT Algorithm 5, by using SGT (sequential group testing), all trigger nodes can be identified in $O(|C_T|\log \Delta)$ time, where $|C_T|$ is the number of vertices on the convex hull of the set of triggers ($C_T$ is the convex hull of the set of trigger nodes within a hexagon as shown in FIG. 9) and $\Delta$ is the maximum degree of all nodes in the network. Hence, there are no more than $\Delta+1$ nodes within a hexagon.

According to an embodiment, a Quick Identification method is used in order to reduce the number of testing rounds. Because all triggers within a hexagon activate a same jammer, a node is a trigger if and only if it belongs to the intersection of the hexagon with the disk of radius r whose center is the jammer. The convexity of the intersection area guarantees that all nodes within a triangle constructed by three identified trigger nodes are also trigger nodes. In general, all nodes inside the convex hull formed by identified trigger nodes $v_1, \ldots, v_k$ can be considered trigger nodes without further testing.

Referring to the TNI-SGT Algorithm 5, T denotes the set of identified triggers and U denotes the set of unidentified nodes. An algorithm for identification of a single trigger node (ISTN) is used to find among the set of unidentified nodes U a single trigger $v_t$ that has the maximum distance to the temporary convex hull of T. The trigger $v_t$ belongs to the (final) convex hull CT of all triggers inside the hexagon. All nodes whose distances from the convex hull of T that are larger than that of v, are eliminated from consideration. The Quick Identification is also used to include all triggers inside the new convex hull of $T \cap \{v_t\}$. Algorithm 5 terminates when all nodes within each hexagon are classified into either triggers or non-triggers.

According to a specific embodiment, the ISTN algorithm used in Algorithm 5 (see line 11) is a localized ISTN algorithm for identifying one trigger node with maximum 'index' among an ordered set U, and is illustrated in Algorithm 6.

---

Algorithm 6 Identification of A Single Trigger Node Algorithm ISTN based on Sequential Group Testing 1:     INPUT: $U = \{v_1, v_2, \ldots, v_m\}$
2:     OUTPUT: $v_k$, s.t $k = \max\{i \mid v_i \text{ is a trigger}\}$ or ouput no triggers.
3:     low = 1, high = m
4:     while low < hight do
5:        $mid = \lfloor \frac{1}{2}(low + high) \rfloor$
6:        $T = \{v_{mid}, \ldots, v_{high}\}$
7:        All node in T transmit $TEST_1$ packet in $t_{test}$ time.
8:        if Noise exists after $t_{test} + \frac{r}{s}$ time then
9:           if (low = high) then
10:            Return $v_{low}$ and exit;
11:          else
12:            low = mid
13:          end if
14:        else
15:          high = mid − 1
16:        end if
17:     end while
18:     return No triggers

---

Algorithm 6 works in a similar manner to a binary search algorithm because Algorithm 6 sequentially divides the set into two halves. However, Algorithm 6 tests for the presence of the triggers in the right half first so that if there exist triggers among U, the one with the maximum index (the rightmost trigger) will be returned. The ISTN Algorithm 6 terminates as soon as one trigger node is identified.

According to an embodiment of the invention, each identification of a trigger node among a set U of nodes by ISTN Algorithm 6 takes at most $\log_2(|U|)$ rounds.

For a more sophisticated jamming model, such as the random reactive jamming model, where a jammer randomly reacts with probability p, identification of trigger nodes can be accomplished using Algorithm 7.

---

Algorithm 7 Fault-tolerance TNI-SGT Algorithm

1:     INPUT: A set U of sensor nodes inside a hexagon, an integer f > 0
2:     OUTPUT: Set of triggers T in U.
3:     All nodes in a group $N_h$ synchronously performs the following to identify all trigger nodes.
4:     /* Check for the presence of triggers inside the hexagon */

---

Algorithm 7 Fault-tolerance TNI-SGT Algorithm (continued)

5:     for i = 1 … f do
6:        All nodes in U transmit $TEST_1$ packet in $t_{test}$ time
7:        if No Noise exists after $t_{test} + \frac{r}{s}$ then
8:           if (i = k) then
9:             Return $T = \emptyset$ and exit
10:          end if
11:        else
12:          Break
13:        end if
14:     end for
15:     $T \leftarrow \emptyset$
16:     /* Individual testing */
17:     for all $x \in U$ do
18:        for i = 1 … k do
19:           Let x transmit $TEST_1$ packet in $t_{test}$ time and listen
20:           if Noise exists no later than $t_{test} + \frac{r}{s}$ then
21:             $T \leftarrow T \cup \{x\}$
22:             $T \leftarrow T \cup \{\text{nodes inside ConvexHull(T)}\}$
                /* Quick Identification*/
23:             Break
24:           end if
25:        end for
26:     end for
27:     return T

---

According to an embodiment of the invention, a set of nodes are identified as non-triggers only if after f testing rounds, no Noise is sensed. Lines 5 to 15 of Algorithm 7 relate to revealing whether there are triggers within the hexagon. Once it is determined that there are triggers within the hexagon, further individual tests are performed to identify the particular nodes that are triggers. Trigger identification ends as soon as all triggers in the convex hull $C_T$ are identified.

Since testing for all hexagons of same color can be performed at the same time, the total number of rounds to identify all triggers in the network will be $c \times (\max\{c_t\}\log \Delta + 1)$ where c is the number of colors and $\max\{c_t\}$ is the maximum size of convex hull of a set of triggers within a hexagon. Although $\max\{c_t\}$ may go up to $\Delta$, the algorithm's performance is often far better than its worst case.

If triggers are only jammed with probability $\frac{1}{2} < p < 1$, then instead of stopping the checking for presence of jammers when no Noise sensed, nodes can keep testing up to a maximum number off times. Since, at most, f rounds are used to cheek if a hexagon contains any triggers and, at most, f($\Delta$+1) rounds are used for individual testing, the total number of rounds for finding triggers in the network is at most cf($\Delta$+2), where c is the number of colors and f is a predefined parameter.

The expected number of identified triggers within a hexagon can be calculated based on the probability that some Noise is sensed by the f testing rounds, which is $1-(1-p)^f$. The probability that a trigger node is correctly identified is also $1-(1-p)^f$. Therefore, the expected number of identified triggers will be $(1-(1-p)^f)(1-(1-p)^f)d > (1-2(1-p)^f)d$. To obtain an expected false-negative rate $\epsilon$ (i.e. the fraction of triggers that are incorrectly classified as non-triggers), f is set to $\lceil \log_{1-p} \epsilon/2 \rceil$. For example, if $p=\frac{3}{4}$ and the desired false-negative rate $\epsilon=0.01$ (i.e. 1%), then f=4. Here, there exists only false-negatives but not false-positives (non-triggers that are classified as triggers).

Algorithm 7 also works for the basic reactive jamming model by simply setting p=1 and f=1, which results in the number of rounds being at most c(Δ+2). According to embodiments of the invention, the number of rounds does not depend on the size of network (the number of sensor nodes) but on the ratio α=R/r and the maximum degree that is often decided by the density of the network. Accordingly, Algorithm 7 is sealable for networks of arbitrary size.

Embodiments of the subject trigger identification procedure (variously ultimately using Algorithms 4, 5, and 6 and Algorithms 4 and 7) were simulated against a practical reactive jamming model in general WSNs. As shown in FIGS. 10A-10F, the performance of the subject localized trigger node identification (LTNI) algorithms against the reactive jamming attack was assessed and compared to the performance of JAM described by Wood et al. in "A jammed-area mapping service for sensor networks" (Proc. 24$^{th}$ IEEE Intl. Real-Time System Symposium, pp. 286-297, 2003) in terms of latency, message overhead and size of jammed regions (quarantine area).

In the series of simulations, n nodes from n=1000 to n=5000 with transmission range r=50 m, and J=5 jammers were randomly planted using the pseudo-uniform distribution in a square area of size 1000 m×1000 m. The transmission range of a jammer is normalized by the $$\alpha = \frac{R}{r} = 5.$$

Experimental implementation of these simulations did not consider packet losses, link-congestion or MAC misbehavior except for the jamming signals in order to evaluate the identification performance only. The simulations for each setup were performed 100 times and the results are provided as averages, which suffice to reflect the efficiency of the subject LTNI algorithms.

The practical networks were modeled using ZigBee protocol for one implementation of the reactive jammers. A wide range of experiments were conducted based on a simple ZigBee protocol using a Carrier Sense Multiple Access/Collision Avoidance (CSMA/CA) channel access mechanism. Request-To-Send (RTS) of size 30 bytes and Clear-To-Send (CTS) of size 30 bytes were implemented in these experiments. The processing time for any type of message is uniformly 10 ms since sensors have limited resource to generate communication messages, and the propagation speed is 3×10$^8$ m/s in both algorithms (JAM and the subject LTNI). To communicate with others, every node needs to send at least three messages (one RTS/CTS pair and a data message) and waits the predefined intervals between those messages, the predefined intervals being 20 ms in these experiments in order to simulate practical WSNs. The size of a communication message is assumed to be bigger than 2347 bytes, so that RTS/CTS is assumed to be sent before legitimate communications begin.

Figure 10A:
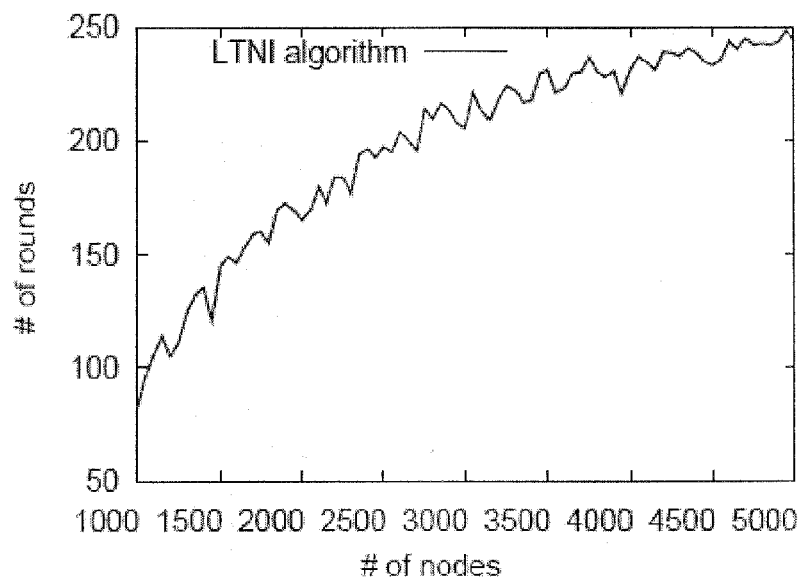
FIGS. 10A-10F show plots indicating performance of a trigger node identification procedure, referred to as LTNI, according to an embodiment of the invention.

FIG. 10A shows the number of testing rounds measured for a variable size of nodes from the number of nodes n between 1000 and 5000 based on the predefined length of a testing round. As shown in FIG. 10A, the testing rounds required to complete the identification of all trigger nodes grow steadily, compared to the incremental size of sensors in denser networks. For tests of nodes increasing from 1000 to 5000 nodes, the testing rounds gradually ascend to only around 150 additional rounds. The observations can be explained follows: sequential GT with Quick Identification and Quick Elimination methods detects all trigger nodes efficiently though more nodes require to be tested with additional rounds as the density of networks increases with additional sensors. Furthermore, the design of the TNI-SGT algorithm (Algorithm 5), where the trigger nodes are only identified on the convex hull of each hexagon, produces a great benefit over the time complexity.

Figure 10B:
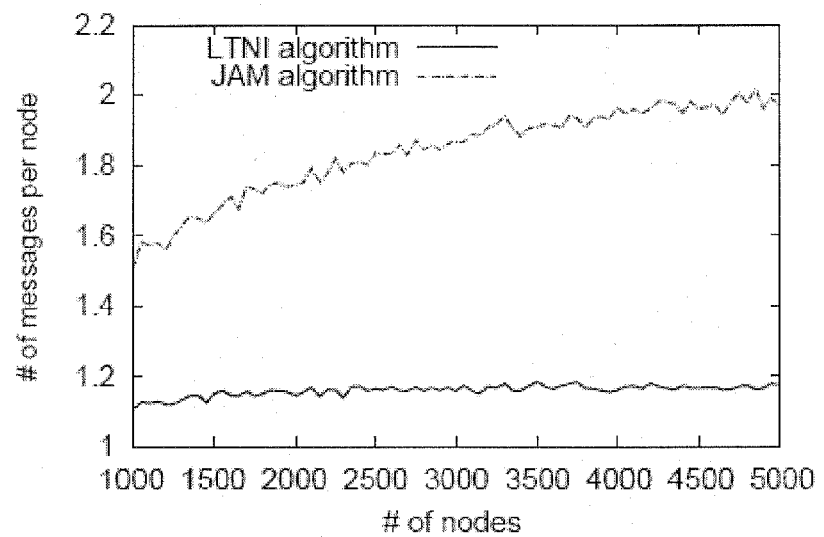

The volume of messages for total identification of trigger nodes is related to energy consumption in resource-limited sensor networks, which implies that less messages generally result in longer network lifetime. The graph in FIG. 10B plots the numbers of messages per node from two solutions, JAM and the subject LTNI, so as to report comparative message complexity. As shown in FIG. 10B, the messages from JAM solution are higher than those from the subject LTNI scheme. In addition, FIG. 10B shows the superiority of message complexity in the subject LTNI over that in JAM, which increases as more nodes are placed in networks. The graph explains that 40% more messages are required to construct jammed areas in JAM where n=1000, however, around 47% less messages suffice to complete the classification of all trigger nodes from the subject LTNI in total where n=5000. In addition to the difference in the number of messages required to complete the classification of trigger nodes (versus constructing jammed areas), JAM demands inevitably more energy than the subject LTNI because JAM includes different types of communication messages including BUILD and PROBE messages except blind message JAMMED in order to quarantine jammed regions. In contrast, the subject LTNI uses mainly small size of testing messages to invoke jammers during identification of all trigger nodes.

Accordingly, embodiments of the invention provide affordable message complexity and energy consumption.

Figure 10C:
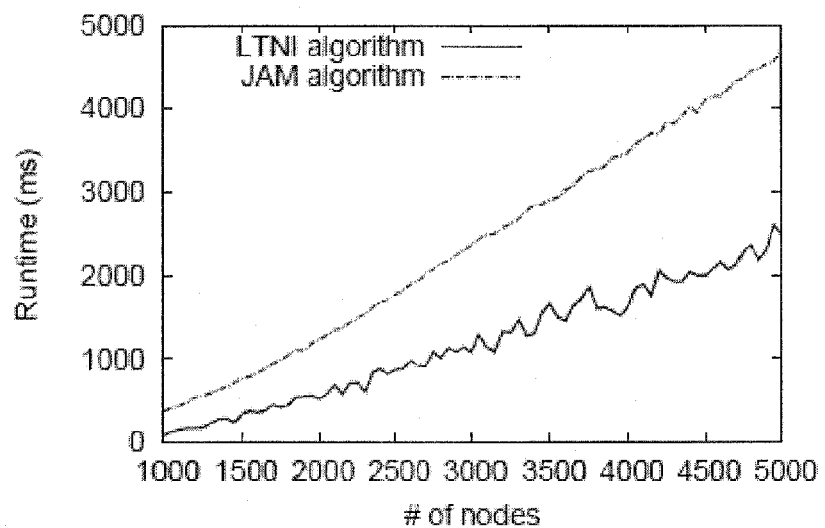
Figure 10D:
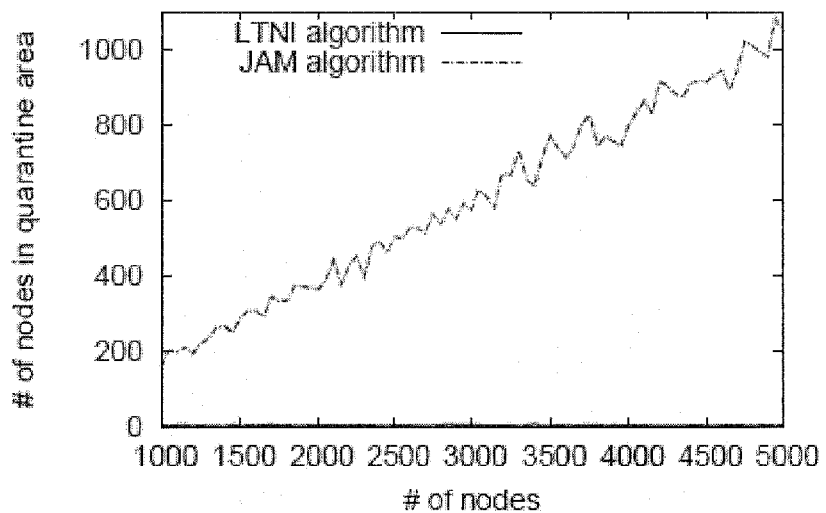

The runtime of the subject LTNI is dependent on the number of rounds and the size of nodes within hexagons containing trigger nodes, since all the hexagons with trigger nodes require further testing until completion of the identification. However, because embodiments of the subject hexagon tiling coloring scheme enable performance of many tests in parallel by utilizing the color assignment generated by the subject k$^2$-coloring Algorithm 4, the overall runtime for complete identification of all trigger nodes does not drastically grow with the size of jammers or nodes. In FIG. 10C, during n=1000 to n=5000, a delay of only 2 seconds occurred to achieve the total identification of trigger nodes, whereas JAM takes twice as long of a time as compared to the subject LTNI. Consequently, the overall length of runtime depends on the size of nodes in jammed regions; however, hexagon tiling coloring scheme helps to keep small increments of runtime by maximizing parallel testing.

After constructing a jamming-resistant routing path by shifting all identified trigger nodes into receivers, there might be unreachable trigger nodes which are placed too deep to be reached by communication messages. The volume of unreachable trigger nodes can be compared to the number of jammed nodes from the JAM algorithm so as to determine the actual size of quarantine areas. The meaning of unreachable trigger nodes in the subject LTNI solution is the same as the jammed nodes in the JAM algorithm, since the jammed nodes would not able to receive any messages and unreachable trigger nodes also cannot receive any messages. As clearly shown in FIG. 10D, the size of the unreachable trigger nodes is always substantially less then the size of the jammed nodes. Specifically, for the subject LTNI algorithm, merely a couple of nodes or less are unreachable trigger nodes and would not be able to receive messages for 1000 to 5000 node networks. By utilizing the successful identification of all trigger nodes, actual jammed areas in which no node would be able to send out any messages to avoid reactive jamming signal is actually very small, so that significantly more nodes would be participating in secure communications as compared to those using the JAM algorithm.

Figure 10E:
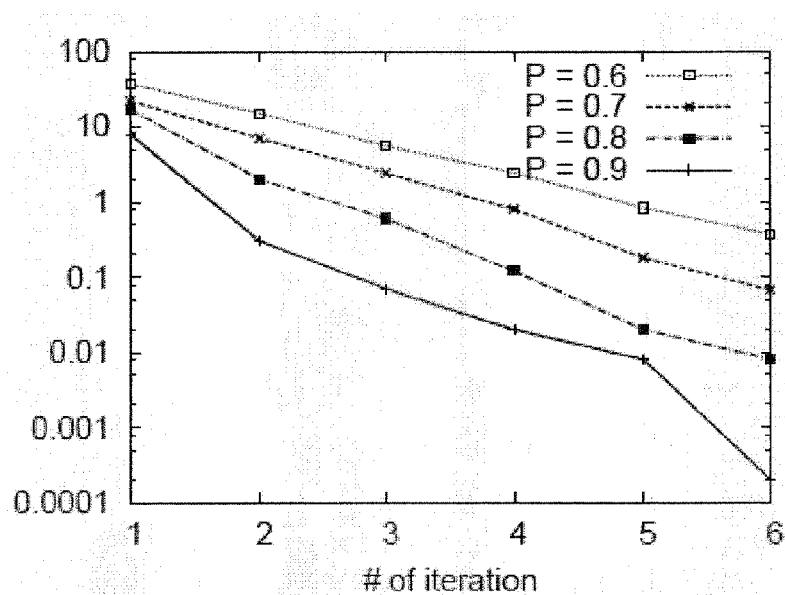

Referring to FIG. 10E, the false-negative rate of Algorithm 7 in a log scale shows that the false-negative rate linearly decreases in the log-scale (i.e. exponentially decreases when the number of duplicated testing f increases). Even with the p=0.6, the false-negative rate quickly decreases to 1% with f=6. That is, the test only needs to be repeated 6 times.

Figure 10F:
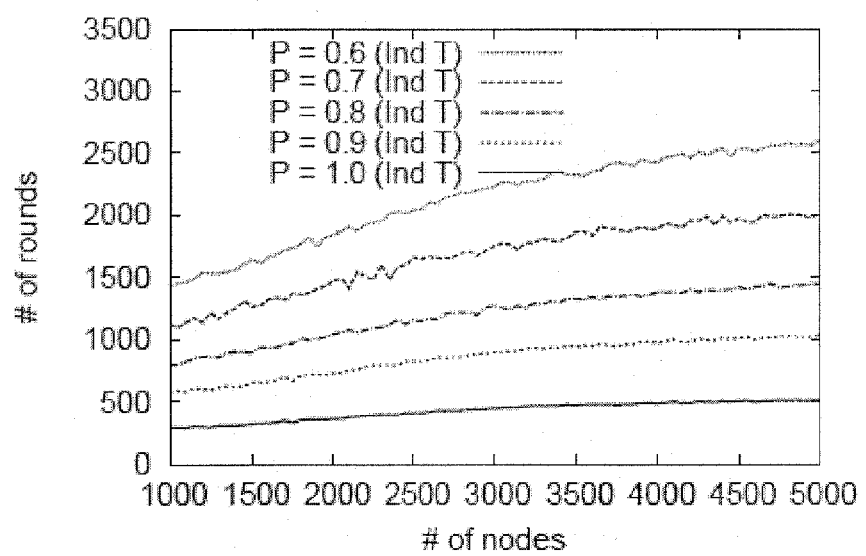

FIG. 10F shows the number of rounds when the targeted false-negative rate is fixed at 1% (for different values of p). As shown in FIG. 10F, the number of rounds increases slightly together with the number of nodes in the network, since putting more nodes in a same fixed area increases the density (i.e. degree of nodes). However, the rate of increase comes closer to zero when n=5000.

Accordingly, embodiments of the subject methods for local identification of all trigger nodes achieve high feasibility with low overhead in terms of time and message complexity by leveraging a sequential GT and hexagon tiling scheme.

All patents, patent applications, provisional applications, and publications referred to or cited herein are incorporated by reference in their entirety, including all figures and tables, to the extent they are not inconsistent with the explicit teachings of this specification.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of routing messages on a wireless sensor network (WSN) having a plurality of sensor nodes, the method comprising:
   identifying trigger nodes of the sensor nodes of the WSN,
      wherein identifying trigger nodes of the sensor nodes of the WSN comprises:
         determining disjoint interference-free testing teams of sensor nodes of the WSN,
         dividing members of each disjoint interference-free testing team into multiple groups; and
         testing each group of the multiple groups on different channels;
   assigning an identified trigger node to be a receiver during a time when victim nodes of the sensor nodes of the WSN in the vicinity of the identified trigger node are assigned as transmitters; and
   stopping transmission from the victim nodes when assigning the identified trigger node as a transmitter,
   wherein determining the disjoint interference-free testing teams of sensor nodes of the WSN comprises:
      finding a set of maximum number of vertex-disjoint maximal cliques of the sensor nodes of the WSN; and
      identifying interferences between the vertex-disjoint maximal cliques to determine sensor nodes belonging to each interference-free testing team of the disjoint interference-free testing teams,
   wherein finding the set of vertex-disjoint maximal cliques of the sensor nodes of the WSN comprises:
      inducing a unit disk graph (UDG) subgraph G'=(W,E'), where W is a set of victim nodes in the WSN and E' is a set of edges between victim nodes within a range effected by a jammer;
      ordering edges in the set of edges E' in decreasing order of length:
      consecutively, in the decreasing order of length, finding all maximal cliques with each edge as the longest edge; and
      removing every maximal clique from the all maximal cliques that intersects with a clique C of the all maximal cliques, where the clique C is a clique of the all maximal cliques which intersects with a minimum number of other cliques in the all maximal cliques,
      whereby after the removing of every maximal clique from the all maximal cliques that intersects with the clique C, remaining maximal cliques of the all maximal cliques provide the set of maximum number of vertex-disjoint maximal cliques.

2. The method of routing messages according to claim 1, wherein identifying interferences between the vertex-disjoint maximal cliques to determine sensor nodes belonging to each interference-free testing team of the disjoint interference-free testing teams comprises:
   using each of the vertex-disjoint maximal cliques as a testing team when 13 or more radio channels are available for conducting tests, where any two testing teams with a 1-length shortest clique-path (SCP) are tested on different channels of the 13 or more radio channels; and
   if less than 13 radio channels are available for testing, then:
      constructing an auxiliary graph H=(C,E), where each of the vertex-disjoint maximal cliques is mapped into a node v∈C where two nodes are connected if and only if their corresponding cliques have 1-length SCP from each other;
      finding a maximal independent set (MIS) in H and testing the vertex-disjoint maximal cliques corresponding to the MIS using arbitrary channels of the less than 13 available radio channels; and
      updating the auxiliary graph H by removing all tested cliques and iterating the constructing and the finding until all cliques of the vertex-disjoint maximal cliques are tested.

3. The method of routing messages according to claim 1, wherein dividing members of each disjoint interference-free testing team into multiple groups comprises:
   constructing a (d, z)-disjunct matrix by creating a t H n matrix M, each entry of the matrix M is made to be 1 with probability p, where $$p = \frac{1}{d+1},$$

$$t = 2\left(\frac{(d+1)^{d+1}}{d^d}\right)\left(z - 1 + \ln\left(\frac{1}{1-p'}\right) + (d+1)\ln n\right)$$

rows, d is a number of trigger nodes, and n is a number of victim nodes in a testing team; and
   using the matrix M to group members of each disjoint interference free testing team into the multiple groups.

4. The method of routing messages according to claim 3, wherein the (d, z) disjunct matrix is a (d, 1) disjunct matrix.

5. The method of routing messages according to claim 3, wherein testing each group of the multiple groups on different channels comprises:
assigning each group of the multiple groups a corresponding channel frequency, where each group within an m number of the multiple groups is assigned a different channel frequency from that of other groups within the m number of the multiple groups, where m is a number of available radios of the sensor nodes of the WSN and the multiple groups are tested within $$\left\lceil \frac{t}{m} \right\rceil$$

rounds;
broadcasting, via a victim node in each group within the m number of the multiple groups, a single bit on the corresponding channel frequency if and only if the matrix M has a 1 in a position of a row corresponding to the group and a column corresponding to the victim node; and
detecting, via the victim node, any jamming signals resulting from the broadcasting and transmitting a jamming alarm upon the detecting of the any jamming signals.

6. The method of routing messages according to claim 5, wherein the victim node transmits the jamming alarm to a nearest dominating node to the victim node in its group.

7. The method of routing messages according to claim 1, wherein dividing members of each disjoint interference-free testing team into multiple groups comprises:
constructing a (d, z)-disjunct matrix by creating a t H n matrix M, each entry of the matrix M is made to be 1 with probability p, where $$p = \frac{1}{d+1}, t = \frac{\tau \ln n(d+1)^2}{(\tau - \gamma(d+1))^2}$$

rows, an upper bound of error probability $$\gamma = \frac{(10\tau - 8\tau^2 - \tau^{-d} - 1)}{2},$$

$\tau=(d/(d+1))^d$, d is a number of trigger nodes, and n is a number of victim nodes in a testing team; and
using the matrix M to group members of each disjoint interference free testing team into the multiple groups.

8. The method of routing messages according to claim 7, wherein testing each group of the multiple groups on different channels comprises:
conducting group testing on m number of groups of the multiple groups in parallel using m different radio channels, where the m groups tested in parallel do not wait for each other to finish the testing such that upon completing a first testing round on one of the m different radio channels, a next testing round is conducted on the one of the m different radio channels, where m is a number of available radios of the sensor nodes of the WSN and the multiple groups are tested within $$\left\lceil \frac{t}{m} \right\rceil$$

rounds.

9. The method of routing messages according to claim 8, wherein conducting the group testing comprises:
for each testing round i (where i=1 to $$\left\lceil \frac{t}{m} \right\rceil$$

rounds):
conducting group testing in groups $g_{im+1}, \ldots g_{im+m}$ of the multiple groups; and
when any nodes in group $g_j$ with j∈[im+1,im+m] detects a jamming signal, indicating a positive outcome for the group $g_j$ and starting testing on $g_{j+m}$;
when no nodes in group $g_j$ detect a jamming signal, while at least one other test in parallel detects a jamming noise, resending, via each victim node in group $g_j$, three more messages to activate possible hidden jammers; and if no jamming signal is detected during a predetermined round length ($\mathcal{L}$), indicating a negative outcome for the group $g_j$ and starting testing on $g_{j+m}$.

10. The method according to claim 1, wherein in each disjoint interference-free testing team a set of dominating nodes collects results of the testing of each group and sends the results to a dominating node leader, wherein the dominating node leader transmits the results and a grouping information to a base station, the method further comprising:
decoding the results at the base station to identify all the trigger nodes within the tested multiple groups.

11. The method according to claim 10, wherein the grouping information is information of a particular (d, z) disjunct matrix used to assign the multiple groups.

12. The method of routing messages according to claim 1, wherein when assigning the identified trigger node as the transmitter, the identified trigger node transmits a message using a channel surfing method.

13. A method of routing messages on a wireless sensor network (WSN) having a plurality of sensor nodes, the method comprising:
identifying trigger nodes of the sensor nodes of the WSN, wherein identifying trigger nodes of the sensor nodes of the WSN comprises:
partitioning a set of nodes into hexagonal testing groups;
coloring each hexagonal testing group into disjoint interference-free groups;
scheduling a set of nodes having the same color within the hexagonal testing groups; and
performing a sequential group testing according to the scheduling to identify all the trigger nodes over each hexagonal testing group;
assigning an identified trigger node to be a receiver during a time when victim nodes of the sensor nodes of the WSN in the vicinity of the identified trigger node are assigned as transmitters; and
stopping transmission from the victim nodes when assigning the identified trigger node as a transmitter.

14. The method of routing messages according to claim 13, wherein the partitioning of the set of nodes into hexagonal testing groups comprises:
partitioning a 2D plane on which the WSN is deployed into regular hexagons forming a hexagon tiling, wherein all nodes located in a same hexagon form a hexagonal testing group of the hexagonal testing groups, wherein a diameter $D_h$ of a hexagon of the regular hexagons is given as:

$D_h$=r for 1<α≤2;
$D_h$=R−2r for 2<α≤3; and
$D_h$=r for α>3, where α is R/r, R is a transmission range radius of a jammer, and r is a transmission range radius of a node of the WSN; and wherein the coloring of each hexagonal testing group into disjoint interference-free groups comprises:
assigning a $Color_{h(i,j)}$ for each hexagon h(i,j) of the hexagon tiling H from a total number of $k^2$ colors according to (j mod k)k+(i mod k)+1, where $$k = \varphi \frac{2d}{\sqrt{3}} + 1\kappa$$

and distance d 0 $\mathfrak{R}^+$, wherein any two hexagons $h_1$, $h_2$ 0 H with $d(h_1,h_2) \leq d$ have different colors.

15. The method of routing messages according to claim 14, wherein each node of the set of nodes determines its hexagon and color by:
identifying a Cartesian location coordinate (x, y) of the node with respect to a reference node and computing a hexagonal coordinate ($x^h$, $y^h$) of the node according to $$x^h = \frac{\left(x - \frac{y}{\tan\frac{\pi}{3}}\right)}{\frac{\sqrt{3} D_h}{2}} \text{ and } y^h = \frac{y\sin\frac{\pi}{3}}{\frac{\sqrt{3} D_h}{2}}$$

to determine its hexagon, wherein the hexagon in which the node is located is given as h(i,j) where i=$x^h$+½ and j=$y^h$+½; and determining its color by computing $Color_{h(i,j)}$←(j mod k)k+(i mod k)+1, where $$k = \varphi(R+r) \Big/ \frac{\sqrt{3r}}{2} \kappa = \varphi \frac{2(\alpha+1)}{\sqrt{3}} \kappa (\text{if } \alpha \leq 2 \text{ or } \alpha > 3) \text{ and } k =$$

$$\varphi(R+r) \Big/ \frac{\sqrt{3}(R-2r)}{2} \kappa = \varphi \frac{2(\alpha+1)}{\sqrt{3}(\alpha-2)} \kappa (\text{if } 2 < \alpha \leq 3).$$

16. The method of routing messages according to claim 13, wherein scheduling the set of nodes having the same color within the hexagonal testing groups and performing the sequential group testing according to the scheduling to identify all the trigger nodes over each hexagonal testing group comprises:
scheduling each hexagonal testing group with the same color to conduct the sequential group testing at a same time; and
performing the sequential group testing by:
transmitting, via all nodes in the scheduled hexagonal testing groups, a TEST1 packet;
if no jamming signals are detected after a predetermined time from the transmitting of the TEST1 packet, then indicating that no triggers exist in the scheduled hexagonal testing groups; and
if a jamming signal is detected during the predetermined time, then identifying a corresponding trigger node.

17. The method of routing messages according to claim 16, wherein identifying the corresponding trigger node comprises:
for a scheduled hexagonal testing group that contains a detected jamming signal after the predetermined time from the transmitting of the TEST1 packet:
dividing the nodes ($v_1$, $v_2$, . . . , $v_m$) within the scheduled hexagonal testing group into two halves according to $$mid = \left\lfloor \frac{1}{2}(\text{low} + \text{high}) \right\rfloor,$$

where low=1 and high=m; and
transmitting the TEST1 packet, via nodes of a right half set T of the two halves, where T={$v_{mid}$, . . . , $v_{high}$};
if the jamming signal is detected after the predetermined time, then
if (low=high) then $v_{low}$ is determined to be a trigger node;
else the nodes are divided again using low=mid and the transmitting of the TEST1 packet is performed again;
else the nodes are divided again using high=mid−1 and the transmitting of the TEST1 packet is performed again.

18. The method of routing messages according to claim 16, wherein a set of nodes are identified as non-triggers if the indicating that no triggers exist in the scheduled hexagonal testing groups is consistent after a predetermined number of testing rounds.

19. A wireless sensor network comprising a plurality of sensor nodes, wherein each sensor node comprises:
a sensor;
a processor;
a memory;
a transceiver;
a hexagon identification module for identifying an assigned hexagon;
a color identification module for identifying an assigned color within the assigned hexagon; and
a time slot identification module for identifying a testing schedule,
wherein the hexagon identification module determines the assigned hexagon by identifying a Cartesian location coordinate (x, y) of the sensor node with respect to a reference node and using the processor to compute a hexagonal coordinate ($x^h$, $y^h$) of the node according to $$x^h = \frac{\left(x - \frac{y}{\tan\frac{\pi}{3}}\right)}{\frac{\sqrt{3} D_h}{2}} \text{ and } y^h = \frac{y\sin\frac{\pi}{3}}{\frac{\sqrt{3} D_h}{2}}$$

to determine its hexagon, where $D_h$ is a diameter of the hexagon, wherein the hexagon in which the sensor node is located is given as h(i, j) where i=$x^h$+½ and j=$y^h$+½;
wherein the color identification module determines the color of the assigned hexagon by using the processor to compute $Color_{h(i,j)}$←(j mod k)k+(i mod k)+1, where $$k = \varphi(R+r) \bigg/ \frac{\sqrt{3}r}{2} \kappa = \varphi \frac{2(\alpha+1)}{\sqrt{3}} \kappa \text{(if } \alpha \le 2 \text{ or } \alpha > 3\text{) and } k =$$

$$\varphi(R+r) \bigg/ \frac{\sqrt{3}(R-2r)}{2} \kappa = \varphi \frac{2(\alpha+1)}{\sqrt{3}(\alpha-2)} \kappa \text{(if } 2 < \alpha \le 3\text{),}$$

where R is a transmission range radius of a jammer, r is a transmission range radius of the sensor node, and α is R/r; and wherein the time slot identification module assigns a testing time according to the color of the assigned hexagon.

20. A method of defending a wireless sensor network against jammer attacks, the method comprising:
  identifying trigger nodes in a wireless sensor network (WSN) by:
    determining disjoint interference-free testing teams of sensor nodes of the WSN, wherein determining the disjoint interference-free testing teams of sensor nodes of the WSN comprises:
    finding a set of maximum number of vertex-disjoint maximal cliques of the sensor nodes of the WSN, wherein finding the set of vertex-disjoint maximal cliques of the sensor nodes of the WSN comprises:
      inducing a unit disk graph (UDG) subgraph G'=(W, E'), where W is a set of victim nodes in the WSN and E' is a set of edges between victim nodes within a range effected by a jammer;
      ordering edges in the set of edges E' in decreasing order of length;
      consecutively, in the decreasing order of length, finding all maximal cliques with each edge as the longest edge; and
      removing every maximal clique from the all maximal cliques that intersects with a clique C of the all maximal cliques where the clique C is a clique of the all maximal cliques which intersects with a minimum number of other cliques in the all maximal cliques,
      whereby after the removing of every maximal clique from the all maximal cliques that intersects with the clique C, remaining maximal cliques of the all maximal cliques provide the set of maximum number of vertex-disjoint maximal cliques; and
    identifying interferences between the vertex-disjoint maximal cliques to determine sensor nodes belonging to each interference-free testing team of the disjoint interference-free testing teams, wherein identifying interferences between the vertex-disjoint maximal cliques to determine sensor nodes belonging to each interference-free testing team of the disjoint interference-free testing teams comprises:
      using each of the vertex-disjoint maximal cliques as a testing team when 13 or more radio channels are available for conducting tests, where any two testing teams with a 1-length shortest clique-path (SCP) are tested on different channels of the 13 or more radio channels; and
      if less than 13 radio channels are available for testing, then:
        constructing an auxiliary graph H=(C,E), where each of the vertex-disjoint maximal cliques is mapped into a node v∈C where two nodes are connected if and only if their corresponding cliques have 1-length SCP from each other;
        finding a maximal independent set (MIS) in H and testing the vertex-disjoint maximal cliques corresponding to the MIS using arbitrary channels of the less than 13 available radio channels; and
        updating the auxiliary graph H by removing all tested cliques and iterating the constructing and the finding until all cliques of the vertex-disjoint maximal cliques are tested;
    dividing members of each disjoint interference-free testing team into multiple groups; and
    testing each group of the multiple groups on different channels; and
  locating a jammer using the identified trigger nodes; and
  deploying a defensive strategy to remove the located jammer.

21. The method of defending a wireless sensor network against jammer attacks according to claim 20, wherein dividing members of each disjoint interference-free testing team into multiple groups comprises:
  constructing a (d, z)-disjunct matrix by creating a t H n matrix M, each entry of the matrix M is made to be 1 with probability p, where $$p = \frac{1}{d+1},$$

$$t = 2\left(\frac{(d+1)^{d+1}}{d^d}\right)\left(z - 1 + \ln\left(\frac{1}{1-p'}\right) + (d+1)\ln n\right)$$

rows, d is a number of trigger nodes, and n is a number of victim nodes in a testing team; and
  using the matrix M to group members of each disjoint interference free testing team into the multiple groups.

22. The method of defending a wireless sensor network against jammer attacks according to claim 21, wherein the (d, z) disjunct matrix is a (d, 1) disjunct matrix.

23. The method of defending a wireless sensor network against jammer attacks according to claim 21, wherein testing each group of the multiple groups on different channels comprises:
  assigning each group of the multiple groups a corresponding channel frequency, where each group within an m number of the multiple groups is assigned a different channel frequency from that of other groups within the m number of the multiple groups, where m is a number of available radios of the sensor nodes of the WSN and the multiple groups are tested within $$\left\lceil \frac{t}{m} \right\rceil$$

rounds;
  broadcasting, via a victim node in each group within the m number of the multiple groups, a single bit on the corresponding channel frequency if and only if the matrix M has a 1 in a position of a row corresponding to the group and a column corresponding to the victim node; and
  detecting, via the victim node, any jamming signals resulting from the broadcasting and transmitting a jamming alarm upon the detecting of the any jamming signals.

24. The method of defending a wireless sensor network against jammer attacks according to claim 23, wherein the victim node transmits the jamming alarm to a nearest dominating node to the victim node in its group.

25. The method of defending a wireless sensor network against jammer attacks according to claim 20, wherein dividing members of each disjoint interference-free testing team into multiple groups comprises:
   constructing a (d, z)-disjunct matrix by creating a t H n matrix M, each entry of the matrix M is made to be 1 with probability p, where $$p = \frac{1}{d+1}, t = \frac{\tau \ln n(d+1)^2}{(\tau - \gamma(d+1))^2}$$

rows, an upper bound of error probability $$\gamma = \frac{(10\tau - 8\tau^2 - \tau^{-d} - 1)}{2},$$

$\tau=(d/(d+1))^d$, d is a number of trigger nodes, and n is a number of victim nodes in a testing team; and
   using the matrix M to group members of each disjoint interference free testing team into the multiple groups.

26. The method of defending a wireless sensor network against jammer attacks according to claim 25, wherein testing each group of the multiple groups on different channels comprises:
   conducting group testing on m number of groups of the multiple groups in parallel using m different radio channels, where the m groups tested in parallel do not wait for each other to finish the testing such that upon completing a first testing round on one of the m different radio channels, a next testing round is conducted on the one of the m different radio channels, where m is a number of available radios of the sensor nodes of the WSN and the multiple groups are tested within $$\left\lceil \frac{t}{m} \right\rceil$$

rounds.

27. The method of routing messages according to claim 26, wherein conducting the group testing comprises:
   for each testing round i (where i=1 to $$\left\lceil \frac{t}{m} \right\rceil$$

rounds):
   conducting group testing in groups $g_{im+1}, \ldots, g_{im+m}$ of the multiple groups; and
   when any nodes in group $g_j$ with j∈[im+1,im+m] detects a jamming signal, indicating a positive outcome for the group $g_j$ and starting testing on $g_{j+m}$;
   when no nodes in group $g_j$ detect a jamming signal, while at least one other test in parallel detects a jamming noise, resending, via each victim node in group $g_j$, three more messages to activate possible hidden jammers; and if no jamming signal is detected during a predetermined round length ($\mathcal{L}$), indicating a negative outcome for the group $g_j$ and starting testing on $g_{j+m}$.

28. A method of defending a wireless sensor network against jammer attacks, the method comprising:
   identifying trigger nodes in the wireless sensor network (WSN) by:
     partitioning a set of nodes into hexagonal testing groups;
     coloring each hexagonal testing group into disjoint interference-free groups;
     scheduling a set of nodes having the same color within the hexagonal testing groups; and
     performing a sequential group testing according to the scheduling to identify all the trigger nodes over each hexagonal testing group; and
   locating a jammer using the identified trigger nodes; and
   deploying a defensive strategy to remove the located jammer.

29. The method of defending a wireless sensor network against jammer attacks according to claim 28, wherein the partitioning of the set of nodes into hexagonal testing groups comprises:
   partitioning a 2D plane on which the WSN is deployed into regular hexagons forming a hexagon tiling, wherein all nodes located in a same hexagon form a hexagonal testing group of the hexagonal testing groups, wherein a diameter $D_h$ of a hexagon of the regular hexagons is given as:
   $D_h$=r for 1<α≤2;
   $D_h$=R−2r for 2<α≤3; and
   $D_h$=r for α>3, where α is R/r, R is a transmission range radius of a jammer, and r is a transmission range radius of a node of the WSN; and
   wherein the coloring of each hexagonal testing group into disjoint interference-free groups comprises:
     assigning a $Color_{h(i,j)}$ for each hexagon h(i,j) of the hexagon tiling H from a total number of $k^2$ colors according to (j mod k)k+(i mod k)+1, where $$k = \varphi \frac{2d}{\sqrt{3}} + 1\kappa$$

and distance d 0 $\mathfrak{R}^+$, wherein any two hexagons $h_1$, $h_2$ 0 H with $d(h_1, h_2)$≤d have different colors.

30. The method of defending a wireless sensor network against jammer attacks according to claim 29, wherein each node of the set of nodes determines its hexagon and color by:
   identifying a Cartesian location coordinate (x, y) of the node with respect to a reference node and computing a hexagonal coordinate ($x^h$, $y^h$) of the node according to $$x^h = \frac{\left(x - \frac{y}{\tan\frac{\pi}{3}}\right)}{\frac{\sqrt{3} D_h}{2}} \text{ and } y^h = \frac{y \sin\frac{\pi}{3}}{\frac{\sqrt{3} D_h}{2}}$$

to determine its hexagon, wherein the hexagon in which the node is located is given as h(i, j) where i=$x^h$+½ and j=$y^h$+½; and
   determining its color by computing $Color_{h(i,j)}$←(j mod k)k+(i mod k)+1, where $$k = \varphi(R+r) \Big/ \frac{\sqrt{3r}}{2} \kappa = \varphi \frac{2(\alpha+1)}{\sqrt{3}} \kappa \text{(if } \alpha \leq 2 \text{ or } \alpha > 3\text{) and } k =$$

-continued $$\varphi(R+r) \bigg/ \frac{\sqrt{3}(R-2r)}{2} \kappa = \varphi \frac{2(\alpha+1)}{\sqrt{3}(\alpha-2)} \kappa (\text{if } 2 < \alpha \leq 3).$$

31. The method of defending a wireless sensor network against jammer attacks according to claim 28, wherein scheduling the set of nodes having the same color within the hexagonal testing groups and performing the sequential group testing according to the scheduling to identify all the trigger nodes over each hexagonal testing group comprises:
- scheduling each hexagonal testing group with the same color to conduct the sequential group testing at a same time; and
- performing the sequential group testing by:
  - transmitting, via all nodes in the scheduled hexagonal testing groups, a TEST1 packet;
  - if no jamming signals are detected after a predetermined time from the transmitting of the TEST1 packet, then indicating that no triggers exist in the scheduled hexagonal testing groups; and
  - if a jamming signal is detected during the predetermined time, then identifying a corresponding trigger node.

32. The method of defending a wireless sensor network against jammer attacks according to claim 31, wherein identifying the corresponding trigger node comprises:
for a scheduled hexagonal testing group that contains a detected jamming signal after the predetermined time from the transmitting of the TEST1 packet:
- dividing the nodes ($v_1, v_2, \ldots, v_m$) within the scheduled hexagonal testing group into two halves according to $$mid = \left\lfloor \frac{1}{2}(\text{low} + \text{high}) \right\rfloor,$$

where low=1 and high=m; and
- transmitting the TEST1 packet, via nodes of a right half set T of the two halves, where T={$v_{mid}, \ldots, v_{high}$};
- if the jamming signal is detected after the predetermined time, then
  - if (low=high) then $v_{low}$ is determined to be a trigger node;
  - else the nodes are divided again using low=mid and the transmitting of the TEST1 packet is performed again;
- else the nodes are divided again using high=mid−1 and the transmitting of the TEST1 packet is performed again.

33. The method of defending a wireless sensor network against jammer attacks according to claim 31, wherein a set of nodes are identified as non-triggers if the indicating that no triggers exist in the scheduled hexagonal testing groups is consistent after a predetermined number of testing rounds.

* * * * *

UNITED STATES PATENT AND TRADEMARK OFFICE
CERTIFICATE OF CORRECTION

| | | |
|---|---|---|
| PATENT NO. | : 8,705,407 B2 | Page 1 of 1 |
| APPLICATION NO. | : 13/180907 | |
| DATED | : April 22, 2014 | |
| INVENTOR(S) | : My T. Thai | |

It is certified that error appears in the above-identified patent and that said Letters Patent is hereby corrected as shown below:

In the Specification

Column 11,
Line 35, "formed by it, v, and" should read --formed by $u$, $v$, and--.

Column 13,
Line 53, "degree A" should read --degree$\Delta$--.

Column 21,
Line 21, "sides /1;2," should read --sides ½,--.

Column 23,
Line 53, "jammer/invoked" should read --jammer $j$ invoked--.

Column 25,
Line 9, "of v, are" should read --of $v_t$ are--.
Line 11, "of T ∩ {v$_t$}" should read --of T ∪ {v$_t$}--.

Column 26,
Line 49, "number off times" should read --number of $f$ times--.

Column 27,
Line 8, "is sealable" should read --is scalable--.

Signed and Sealed this
Twenty-fifth Day of November, 2014

Michelle K. Lee
*Deputy Director of the United States Patent and Trademark Office*